(12) United States Patent
Miyao

(10) Patent No.: US 7,588,108 B2
(45) Date of Patent: Sep. 15, 2009

(54) METHOD OF CONTROLLING VEHICLE DRIVING SYSTEM

(76) Inventor: Takayuki Miyao, 5-13, Matsukaze-cho, Hiratsuka-shi, Kanagawa-ken (JP) 254-0812

( * ) Notice: Subject to any disclaimer, the term of this patent is extended or adjusted under 35 U.S.C. 154(b) by 542 days.

(21) Appl. No.: 11/373,150

(22) Filed: Mar. 13, 2006

(65) Prior Publication Data
US 2006/0207811 A1 Sep. 21, 2006

(30) Foreign Application Priority Data
Mar. 16, 2005 (JP) ............................... 2005-074186

(51) Int. Cl.
B60K 6/10 (2006.01)
(52) U.S. Cl. ...................... 180/65.27; 180/165; 903/960
(58) Field of Classification Search ............... 180/65.2, 180/65.3, 65.4, 165; 903/903, 960
See application file for complete search history.

(56) References Cited
U.S. PATENT DOCUMENTS

| | | | | |
|---|---|---|---|---|
| 3,882,950 A * | 5/1975 | Strohlein | ................... | 180/165 |
| 4,531,605 A * | 7/1985 | Scholz et al. | ............... | 180/65.2 |
| 4,626,696 A * | 12/1986 | Maucher et al. | ............. | 180/165 |
| 4,679,646 A * | 7/1987 | Greenwood | ................... | 180/165 |
| 5,214,358 A * | 5/1993 | Marshall | ..................... | 180/65.4 |
| 5,568,023 A * | 10/1996 | Grayer et al. | ................. | 180/65.4 |
| 5,798,593 A * | 8/1998 | Salter et al. | ................. | 180/165 |
| 6,506,139 B2 * | 1/2003 | Hirt et al. | ....................... | 477/3 |
| 6,561,947 B2 * | 5/2003 | Koelle et al. | ............... | 180/65.2 |
| 7,108,095 B1 * | 9/2006 | Washington et al. | ........ | 180/165 |
| 7,294,938 B2 * | 11/2007 | Miyao | ........................ | 180/65.2 |

FOREIGN PATENT DOCUMENTS
JP 2003-20970 A 1/2003

* cited by examiner

Primary Examiner—Frank B Vanaman
(74) Attorney, Agent, or Firm—Pravel Intellectual Property Law, P.C.; James W. Pravel

(57) ABSTRACT

A method of controlling a vehicle driving system adapted to accumulate power output intermittently from a thermal engine in a flywheel as rotational energy and only a necessary part of the accumulated energy is taken out to the output shaft of a power dividing type power transmission unit. Thermal engines to which the present invention is applicable include internal-combustion engines and external-combustion engines.

4 Claims, 9 Drawing Sheets

METHOD OF CONTROLLING VEHICLE DRIVING SYSTEM

BACKGROUND OF THE INVENTION

1. Field of the Invention

This invention relates to a method of controlling a vehicle driving system adapted to accumulate power output intermittently from a thermal engine in a flywheel as rotational energy and only a necessary part of the accumulated energy is taken out to the output shaft of a power dividing type power transmission unit. Thermal engines to which the present invention is applicable include internal-combustion engines and external-combustion engines. Generally, a power dividing type power transmission unit comprises a power dividing mechanism, which may be a type using a motor generator where both an inner rotor and an outer rotor rotate or a type where an ordinary motor generator is connected to the reactionary shaft of a differential gear.

2. Description of the Related Art

Known methods of controlling a vehicle driving system of the type under consideration include a control method of accumulating energy in a flywheel and driving a vehicle as disclosed in Jpn. Pat. Appln. Laid-Open Publication No. 2003-020970. The method disclosed in the above cited patent document can be realized by using a drive unit as illustrated in FIG. 1 of the accompanying drawings. Referring to FIG. 1, the drive unit comprises an engine 1, which is an internal-combustion engine, a flywheel 3, a power dividing type power transmission unit 21 and a control unit 27. The control unit 27 typically includes a CPU (central processing unit), a computer equipped with a memory and a power control unit. The signal Acc that is input to the control unit 27 is a signal that corresponds to the pedaled quantity of the accelerator pedal operated by the driver of the vehicle.

The output shaft 1a of the engine 1 is interlocked with the drive shaft 3a of the flywheel 3 by way of a multiplying device (e.g., a speed-up gear) 1A, a drive shaft 1b and a clutch 2. For the purpose of the present invention, the expression of "interlocked" refers to a state where two rotary members are driven to rotate integrally by way of a drive shaft or a state where two rotary members are linked to each other and driven to rotate by way of a power transmission system of a type or another. Examples of mode where two rotary members are linked to each other and driven to rotate by way of a power transmission system of a type or another include a state where they are linked by a gear and a chain and a state where they are linked by a clutch. In FIG. 1, the multiplying device 1A is not indispensable and the output shaft 1a may be directly linked to the drive shaft 1b.

The power dividing type power transmission unit 21 is realized as an electric type power dividing gear box that includes a first motor generator 4, an output shaft 6 and a second motor generator 5. The first motor generator 4 has an outer rotor 4A, an inner rotor 4B, an input shaft 4a and an outlet shaft 4b, of which the input shaft 4a is interlocked with the outer rotor 4A while the outlet shaft 4b is interlocked with the inner rotor 4B. The outer rotor 4A is interlocked with the flywheel 3 by way of the input shaft 4a. The inner rotor 43 is interlocked with the output shaft 6 by way of the outlet shaft 4b. The output shaft 6 is interlocked with the drive wheels 20, 20 of a vehicle. The pedaled quantity Acc input to the control unit 27 is a signal that operates as a command given by the driver to the control unit 27 to set the level of the torque of the output shaft 6.

The first motor generator 4 and the second motor generator 5 are connected to each other by way of the control unit 27 so that the electric power generated by the first motor generator 4 can be transmitted to the second motor generator 5 by way of the control unit 27. The second motor generator 5 is interlocked with the output shaft 6 by way of a drive shaft 5a and gears 5b and 5c. Note, however, that the second motor generator 5 may alternatively be linked directly to the output shaft 6 without using the gears 5b and 5c.

Referring to FIG. 1, when the engine 1 is driven to operate and the clutch 2 is held in an engaged condition, the output torque Te of the engine 1 is converted to torque Te/i at the drive shaft 1b, the clutch 2 and the drive shaft 3a due to the existence of the speedup ratio i of the multiplying device 1A. In other words, when the engine 1 is driven to operate, the torque Te/i of the drive shaft 3a drives the flywheel 3 to accelerate the rotational motion of the latter and causes the first motor generator 4 to operate as generator. On the other hand, when the engine 1 is not driven to operate, the first motor generator 4 is driven to operate as generator only by the rotational energy of the fly wheel 3.

When the first motor generator 4 is operating as generator, torque T1i is produced at the input shaft 4a of the motor generator 4 and reaction torque T1i having a magnitude same as the toque of the input shaft 4a is produced at the outlet shaft 4b regardless if the engine 1 is in operation or not. The torque T1i produced at the outlet shaft 4b mechanically straightly drives the output shaft 6.

In principle, all the electric power generated by the first motor generator 4 is supplied to the second motor generator 5 and the second motor generator 5 is driven to operate as motor by the electric power so that the mechanical power produced by the second motor generator 5 that is operating as motor by turn drives the output shaft 6 by way of the gears 5b and 5c. The mode of control in which "all" the electric power generated by the first motor generator 4 is supplied to the second motor generator 5 is referred to as "basic control" hereinafter.

Of the mechanism illustrated in FIG. 1, the part of the power transmission system 21 from the input shaft 4a to the output shaft 6 is adapted to operate as power dividing type power transmission unit where the power output from the engine 1 is once divided into powers of different states of energy by the first motor generator 4 (a mechanical state and an electric state in the instance of FIG. 1) and the mechanical power obtained at the outlet shaft 4b by the division and the electric power are put together at the output shaft 6. Such a power dividing type power transmission unit is already known.

In the flywheel energy accumulation/driving system of FIG. 1 having the above described configuration, the relationship of formula (a) shown below needs to be established for the engine 1 to operate to generate torque Te/i at the drive shaft 3a and drive the flywheel 3 to rotate and accelerate the rotational speed thereof:

$$Tf=(Te/i)-T1i>0 \quad\quad\quad (a),$$

where Tf is the acceleration torque of the flywheel 3.

Additionally, the relationship of formula (b) shown below is required for the torque T1i of the input shaft 4a in the formula (a) above:

$$T1i=T2/[1+\{(Nf/N2)-1\}\times\eta e] \quad\quad\quad (b),$$

where T2 is the torque indicated to the output shaft 6 and Nf is the rotational speed of the flywheel 3 while N2 is the rotational speed of the output shaft 6 and $\eta e$ is the power transmission efficiency that is observed when the mechanical input power for driving the motor generator 4 to generate electricity is converted into electric power once in the motor generator 4 and turned back to mechanical power by the motor generator 5, which is then transmitted to the output shaft 6.

The above formulas (a) and (b) are stored in the memory of the control unit 27 and used for arithmetic operations by the CPU whenever necessary. The control unit 27 operates for the above-defined basic control according to the outcome of the arithmetic operations. More specifically, the efficiency ηe is experimentally determined in advance and the rotational speed Nf of the flywheel 3 and the rotational speed N2 of the output shaft 6 are detected in advance while the vehicle is running. Then, as the torque T2 of the output shaft 6 is indicated by means of the accelerator pedal, the value of the input torque T1i of the input shaft 4a for causing the motor generator 4 to generate electricity is determined from the formula (b) and then used to substitute the input torque T1i of the formula (a). Then, the engine 1 is operated to meet the requirement of the formula (a). Since Te=0 when the engine 1 is not operated, the flywheel torque Tf in the formula (a) is Tf<0. The rotational speed Nf of the flywheel 3 is being decelerated in such a situation.

When the driver of the vehicle controls the moving speed of the vehicle by operating the accelerator pedal, he or she is only required to indicate the torque T2 of the output shaft 6 regardless if the engine 1 is in operation or not. Then, the control unit 27 sets the power generating torque of the motor generator 4 to T1i according to the indication of the torque T2, using the formula (b).

When the rotational energy accumulated in the flywheel 3 becomes insufficient as a result of that the output shaft 6 is driven to rotate only by the rotational energy of the flywheel 3 without operating the engine 1 with the above described basic control, the clutch 2 is then linked to accumulate rotational energy in the flywheel 3 by the engine 1 according to the above formula (a), while continuing the operation of driving the output shaft 6.

SUMMARY OF THE INVENTION

The first motor generator 4 of the known flywheel energy accumulation/driving system of FIG. 1 is adapted to generate electricity by relative revolutions of the input shaft 4a and the outlet shaft 4b. During an electricity generating operation, both the outer rotor 4A and the inner rotor 4B revolve relatively to each other and generate electricity.

On the other hand, differential gear type flywheel energy accumulation/driving systems comprising a differential gear arranged between the input shaft 4a and the outlet shaft 4b and an ordinary generator having a stator and adapted to generate electricity by relative revolutions of the input shaft 4a and the outlet shaft 4b as in the case of FIG. 1 under a condition where the generator is interlocked with the reactionary shaft of the differential gear are also known. However, no formula that corresponds to the above described formula (b) and provides the base for controlling the differential gear type flywheel energy accumulation/driving system has been developed so far.

Additionally, for automobiles equipped with a flywheel energy accumulation/driving system as illustrated in FIG. 1 and those equipped with a differential gear type flywheel energy accumulation/driving system as described above, it is not known under what conditions the control unit 27 reaccelerates the flywheel 3 by means of the engine 1 without stalling the flywheel 3 while the automobile is running.

Furthermore, it is also not known to what level the rotational speed of the flywheel 3 should be raised when the engine 1 is accelerating the flywheel 3.

Thus, it is the object of the present invention to provide a method of controlling a vehicle driving system that can set the conditions under which the rotational motion of the flywheel is reaccelerated by means of the engine in a flywheel energy accumulation/driving system not comprising a differential gear (see FIG. 1) and also in a differential gear type flywheel energy accumulation/driving system.

(Arrangement of the Method of Controlling a Vehicle Driving System)

A method of controlling a vehicle driving system according to the present invention;

(A) by accumulating the output power of an engine operating along a fuel economizing characteristic curve in a flywheel interlocked with the engine as energy, transmitting the output power of the engine or the accumulated energy to an output shaft by way of a power transmission system to drive the output shaft and the drive wheels of the vehicle interlocked with the output shaft to rotate, (B) the power transmission system;

(a) having a first motor generator interlocked with the flywheel by way of an input shaft and also with the output shaft by way of an outlet shaft and a second motor generator for receiving the output power of the first motor generator as input, (b) the power output from the engine being transmitted sequentially by way of the drive shaft, the flywheel and the input shaft to intermittently accelerate the rotational motion of the flywheel and drive the input shaft, (c) the first motor generator operating generating electric power according to the relative revolutions of the input shaft and the outlet shaft, (d) the second motor generator being interlocked with the drive wheels interlocked with the output shaft or some other drive wheels, (e) basic control being defined so as to supply all the electric power generated by the first motor generator to the second motor generator, (C) the control method being adapted to cause the output shaft to output a torque proportional to the pedaled quantity of an accelerator pedal when the second motor generator is interlocked with the output shaft, (D) the control method being adapted to control the condition of a continuously decreasing rotational speed of the flywheel by driving the drive wheels only by the rotational energy of the flywheel, (E) provided that the rotational speed of the flywheel at the time of restarting the engine in order for the engine to supply rotational energy to the flywheel is the lower limit rotational speed Nfc of the flywheel and the largest power level of the engine operating on the fuel economizing characteristic curve is Pem, while the pedaled quantity Acc of the accelerator pedal corresponding to the largest power level Pem is Acc=1.0 when determining the power level of Acc×Pem=Pei for the value of the lower limit rotational speed Nfc within the range of the pedaled quantity Acc of 0≦Acc<1.0 and the rotational speed Nei of the engine for the power level Pei on the fuel economizing characteristic curve, the lower limit rotational speed Nfc of the flywheel being set according to the value obtained by adding a predetermined value dNe to the value of Nei.

For the above described arrangement, the pedaled quantity Acc=1.0 of the accelerator pedal is the value that makes the output power value of the engine equal to the largest output power value Pem. This will be understood by seeing that Pei=Pem inevitably holds true when Acc=1.0 in the above formula Acc×Pem=Pei.

Additionally, the fuel economizing characteristic curve is a curve which shows the economically best point of fuel consumption for each output power of the engine 1.

With a method of controlling a vehicle driving system according to the invention that is arranged in the above described manner, when the rotational energy of the flywheel 3 is reduced as the output shaft is driven to rotate only by the rotational energy of the flywheel and then the engine 1 is restarted to supply rotational energy to the flywheel 3, the power level of the engine 1 at the time of the restart corresponds to the sum of the power output to the output shaft 6 according to the pedaled quantity Acc of the accelerator pedal and the power for driving and accelerating the flywheel 3.

Therefore, when the accelerator pedal is operated in any ordinary manner, it is possible for the engine 1 that is restarted at that time to supply energy to the flywheel 3 and the output shaft 6 by the quantity they require.

Preferably, in a method of controlling a vehicle driving system according to the present invention, if a predetermined low pedaled quantity Acc of the accelerator pedal is Acc=Acco within the range of the pedaled quantity Acc<1.0, lower limit rotational speed of the flywheel is held to a constant level of Nfco for the range of the pedaled quantity Acc of 0≦Acc<Acco.

With this arrangement for a method of controlling a vehicle driving system according to the invention, the flywheel is driven intermittently for the range of Acco≦Acc<1.0 on the basis of the lower limit rotational speed Nfc of the flywheel obtained by adding a predetermined value dNe to the value of Nei so that it is possible to drive the flywheel to rotate without stalling it. Additionally, since the lower limit rotational speed Nfco is held to a constant level that is determined to at Acco in the range of Acco≦Acc<1.0 also for the range of 0≦Acc<Acco, the fuel efficiency is prevented from falling.

Preferably, in a method of controlling a vehicle driving system according to the present invention, when the engine is operated intermittently to drive the input shaft and the flywheel, while operating on the fuel economizing characteristic curve, and raising the rotational speed of the flywheel to an upper limit rotational speed (Nfm) of the flywheel, the upper limit rotational speed (Nfm) of the flywheel is decreased according to the reduction of the pedaled quantity Acc of the accelerator pedal.

With this arrangement, when the engine is restarted to supply rotational energy to the flywheel, while operating on the fuel economizing characteristic curve, the engine drives the flywheel in such a way it reduces the upper limit rotational speed Nfm of the flywheel according to the decrease of the pedaled quantity Acc of the accelerator pedal. Therefore, as the pedaled quantity of the accelerator pedal is decreased, the largest rotational speed of the engine is reduced to by turn reduce the purring noise level of the revolving engine so that the driver can perceive that the engine is operating normally and smoothly without having any strange feeling.

Preferably, in a method of controlling a vehicle driving system according to the present invention, the Acco is equal to the low level pedaled quantity of the accelerator pedal corresponding to the point on the fuel economizing characteristic curve (Fec) where a rapid fall of the curve starts. With this arrangement, it is possible to reliably prevent a fall of fuel efficiency within the range of 0≦Acc<Acco.

Preferably, in a method of controlling a vehicle driving system according to the present invention, the value of dNe is equal to about 100 rpm. With this arrangement, it is possible to reliably prevent the flywheel from stalling when the flywheel is reaccelerated.

DETAILED DESCRIPTION OF THE PREFERRED EMBODIMENTS

Now, a method of controlling a vehicle driving system according to the present invention will be described in greater detail by referring to accompanying drawings that illustrate preferred embodiments of the invention. However, it may be clear that the present invention is by no means limited to the embodiments that will be described hereinafter.

Firstly, before describing the method, a vehicle driving system that can be used with a control method according to the present invention will be described. FIG. 2 schematically illustrates a flywheel energy accumulation/driving system as an example of such a vehicle driving system. While the control method according to the invention is applicable to the part of the mechanical system of a flywheel energy accumulation/driving system that does not use a differential gear as illustrated in FIG. 1, the control method of the present invention is applied to a flywheel energy accumulation/driving system that uses a differential gear as illustrated in FIG. 2 in this embodiment.

Figure 1:
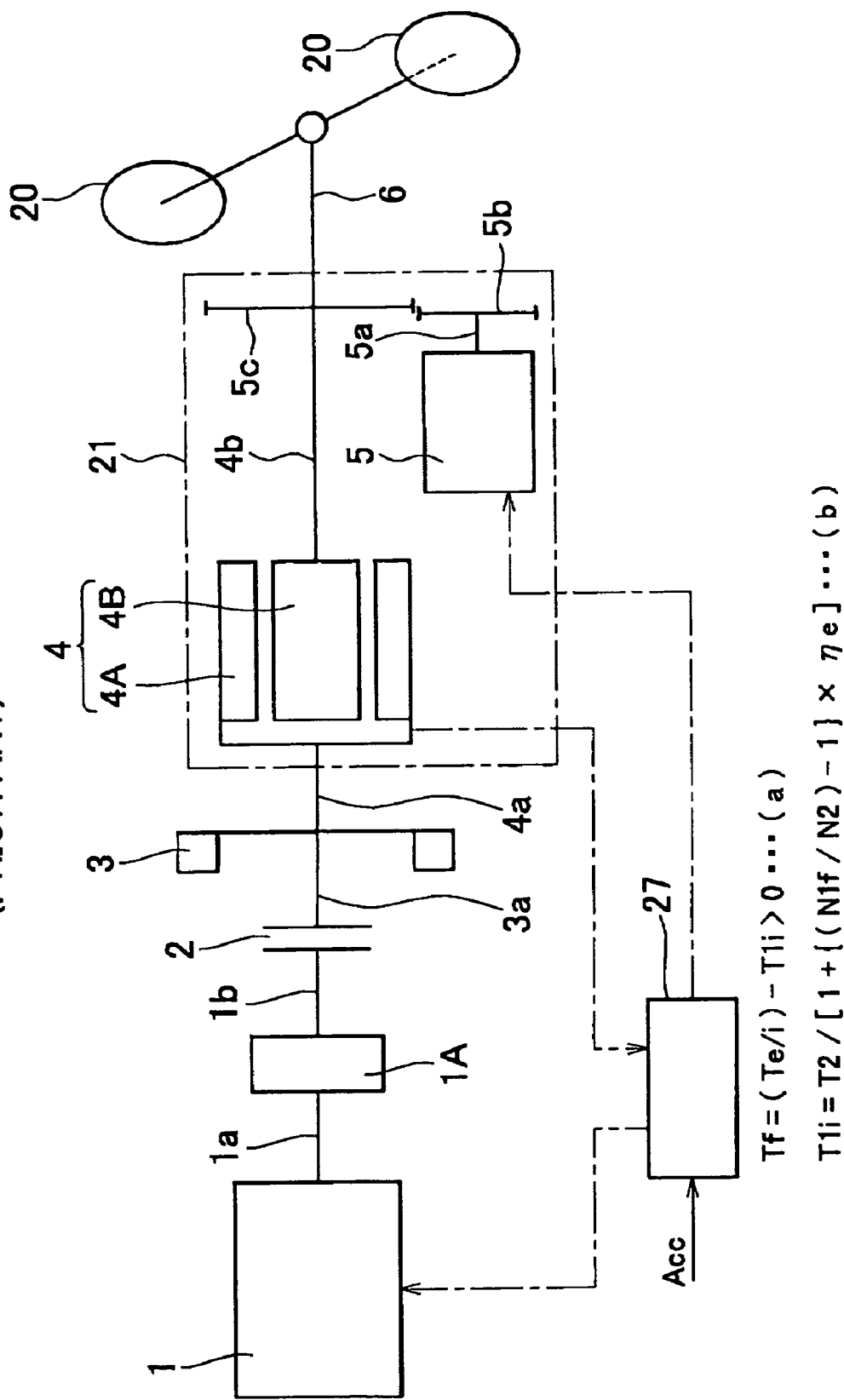
FIG. 1 is a schematic block diagram of a known vehicle driving system.
Figure 2:
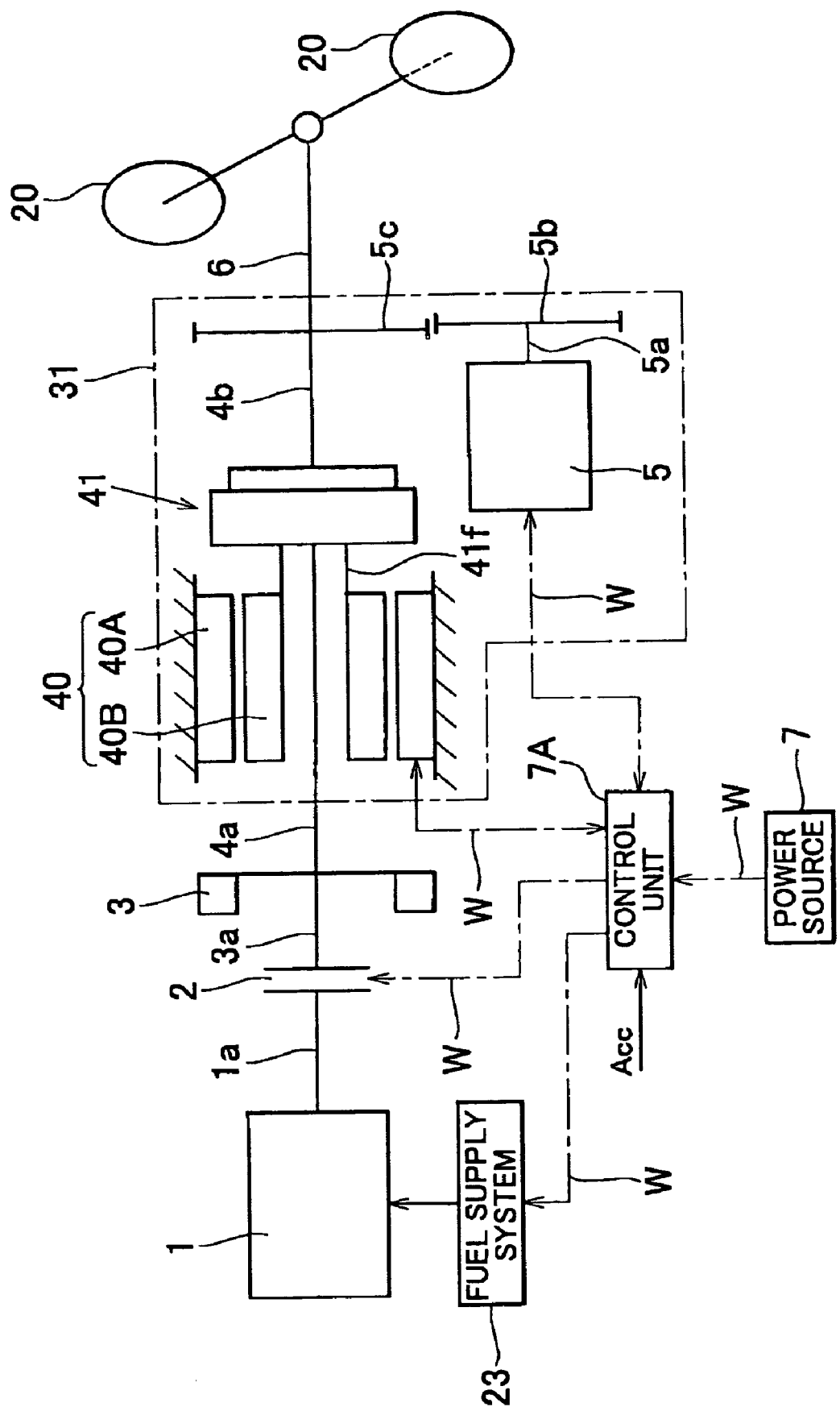
FIG. 2 is a schematic skeletonized diagram of a vehicle driving system that comprises a differential gear and can be used with a method of controlling a vehicle driving system according to the invention.

While the following description is mainly concentrated on the system illustrated in FIG. 2, the system of FIG. 1 will also be referred to whenever it may be convenient to describe the present invention by referring to the system of FIG. 1.

Figure 3:
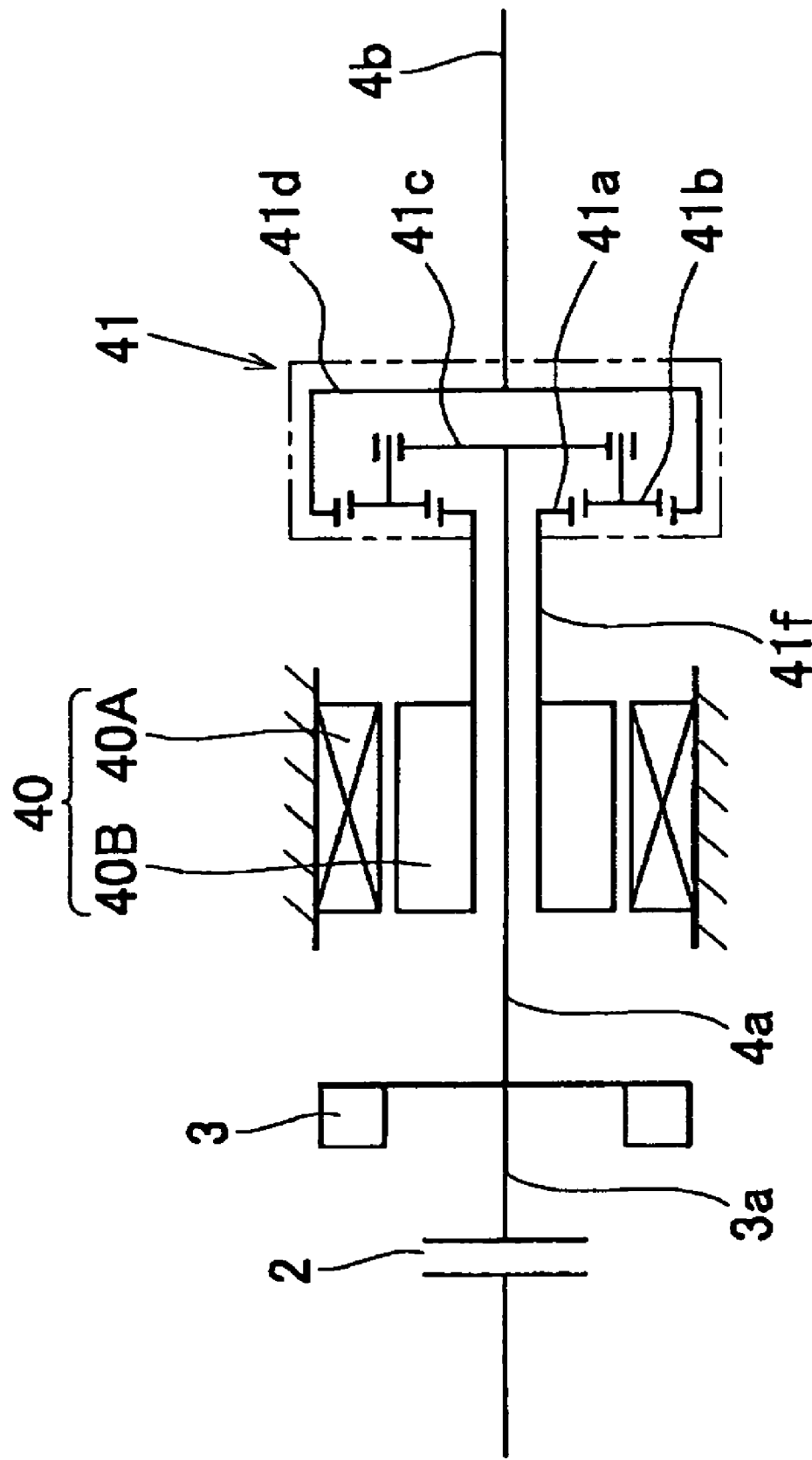
FIG. 3 is a schematic skeletonized diagram illustrating the differential gear of FIG. 2 in greater detail.

FIG. 3 is a schematic illustration of the differential gear used in the system of FIG. 2, showing the internal structure thereof. In the instance of FIG. 3, a differential gear 41 and a first motor generator 40 constitute a motor generator that corresponds to the motor generator 4 of FIG. 1. The members in FIGS. 2 and 3 that are identical with their counterparts of FIG. 1 are denoted respectively by the same reference symbols. It may be appreciated that FIG. 2 illustrates only a flywheel energy accumulation/driving system to which the present invention is applicable and the present invention is by no means limited to the system illustrated in FIG. 2.

The flywheel energy accumulation/driving system of FIG. 2 comprises an engine 1, a flywheel 3, a power dividing type power transmission unit 31, an output shaft 6, a control unit 7A and a power source 7. The power dividing type power transmission unit 31 includes a first motor generator 40, a differential gear 41 and a second motor generator 5. In short, the power dividing type power transmission unit 31 that is a power transmission system extending from the input shaft 4a to the output shaft 6 is a differential gear type power transmission unit.

The control unit 7A includes a CPU that is an arithmetic and control unit, a memory that is a storage medium, a power control unit and the like. The power control unit has a function of controlling the first motor generator 40 (for example, torque control). The power control unit is typically formed by using an inverter.

The input port of the control unit 7A is adapted to receive as input a pedaled quantity signal Acc that is generated as a function of the quantity by which a pedal is operated by a driver. The memory stores the program for realizing the method of controlling the operation of accumulating energy and driving a flywheel, which will be described in greater detail hereinafter and the conditional formulas to be used by the program. The memory has a storage region for storing the data required by the program. The CPU operates according to the program stored in the memory for arithmetic operations.

A fuel supply system 23 is connected to the engine 1 and adapted to supply fuel to the engine 1 according to a command from the control unit 7A. The control unit 7A also controls the operations of the clutch 2, the first motor generator 40 and the second motor generator 5. The power source 7 is formed by using a secondary battery or a capacitor so as to supply power to the control unit 7A or devices that require electric power in addition to the above listed ones. In FIG. 2, reference symbol W denotes a wiring. Note that a wiring W indicted by a single line may include a plurality of electric wires.

While the first motor generator 40 supplies electric power to the second motor generator 5, the power source 7 can additionally supply electric power to the second motor generator 5. When power is supplied to the second motor generator 5 from the power source 7, the output torque of the second motor generator produced by its operation is enhanced by the additional electric power to by turn enhance the torque of the output shaft 6 in addition to the effect of providing the output shaft 6 with torque by the potential of the engine 1.

The first motor generator 40 includes a stator 40A and a rotor 40B. When electric power is supplied to the first motor generator 40, it operates as motor. On the other hand, when the reactionary shaft 41f that is interlocked with the rotor 40B is driven and an electric current is output from the first motor generator 40, the first motor generator 40 operates as generator by definition so that it is possible to take out electric power from the first motor generator 40 that is operating as generator. The electric power generated by the first motor generator 40 is supplied to the second motor generator 5 by way of an electric power control unit in the control unit 7A.

The electric power control unit executes a predetermined process on the electric power output from the first motor generator 40. For example, when a load is applied to the output electric power by the electric power control unit, it is possible to generate a torque that corresponds to the load at the reactionary shaft 41f that is interlocked with the rotor 40B of the first motor generator 40. Then, as a torque is generated at the reactionary shaft 41f, a torque that corresponds to the torque of the reactionary shaft 41f is generated at the input shaft 4a and the outlet shaft 4b of the differential gear 41.

Additionally, as the electric power generated by the first motor generator 40 is supplied to the second motor generator 5 by the control unit 7A, the output torque of the second motor generator 5 and the torque generated at the outlet shaft 4b are put together at the output shaft 6 so that the torque of the drive wheels 20, 20 can be controlled by way of the output shaft 6.

As shown in FIG. 3, the differential gear 41 includes a ring gear 41d, a planetary gear 41b and a sun gear 41a. The planetary gear 41b is held by a carrier 41c. The input shaft 4a extending from the drive shaft 3a is interlocked with the carrier 41c while the planetary gear 41b is engaged with the sun gear 41a and the ring gear 41d and the sung gear 41a is interlocked with the rotor 40B of the first motor generator 40 by way of the reactionary shaft 41f.

It should be noted, however, FIG. 3 shows only a possible combination of gears for the differential gear 41. Generally speaking, one of the three gear members including a sun gear 41a, a carrier 41c and a ring gear 41d is interlocked with the input shaft 4a and another one is interlocked with the outlet shaft 4b while the remaining one is interlocked with the reactionary shaft 41f.

Therefore, generally, the inside of the enclosure indicated by double-dotted broken lines of the differential gear 41 in FIG. 3 is illustrated as a black box and the members coming out from the black box are expressed respectively as a reactionary shaft 41f, an input shaft 4a and an outlet shaft 4b as shown in FIG. 2. While the multiplying device 1A in FIG. 1 is omitted from FIG. 2, the multiplying device 1A may or may not be used for the embodiment.

With the arrangement of the differential gear 41 used for the purpose of this embodiment, when an appropriate critical speed ratio ec is selected, it is possible to broaden the operational range $0 \leq e \leq ec$ where the vehicle driving system can be used efficiently for the ratio e of the rotational speed n1 of the input shaft 4a to the rotational speed N2 of the output shaft 6, or $e = N2/n1$. It is well known that the power dividing type power transmission system 31 of FIG. 2 shows an excellent power transmission efficiency for the above described range of $0 \leq e \leq ec$ but only a low power transmission efficiency for $ec < e$. The reason for this is that there arises a power cycle where the second motor generator 5 absorbs power from the output shaft 6 for generating electricity within the range of $ec < e$ and the motor generator 40 is driven to operate as motor by the generated electric power so that consequently the power loss increases in the power dividing type power transmission system 31.

Since the flywheel energy accumulation/driving system of this embodiment is arranged in a manner as described above, the engine 1 is operated as fuel is supplied from the fuel supply system 23 to the engine 1 and the engine 1 by turn outputs power. The output power of the engine 1 can be controlled by controlling the fuel being supplied to the engine 1.

The output power of the engine 1 (1) drives the input shaft 4a so as to drive the output shaft 6 to rotate and (2) also drives the flywheel 3 to rotate so as to accumulate energy in the flywheel 3. Then, the output power of the engine 1 (3) drives the input shaft 4a of the first motor generator 40 so as to cause the first motor generator 40 to generate electric power.

The electric power generated by the first motor generator 40 is supplied to the second motor generator 5 by way of the electric power control unit in the control unit 7A. Note that the mode of control in which "all" the electric power generated by the first motor generator 40 is supplied to the second motor generator 5 is referred to as "basic control". As electric power is supplied from the first motor generator 40 to the second motor generator 5, the second motor generator 5 operates as motor and generates output torque Tm at the output shaft 5a thereof. Then, the torque Tm is transmitted to the output shaft 6 by way of the gears 5b, 5c.

On the other hand, when electric power is supplied from the first motor generator 40 to the second motor generator 5, the electric power control unit in the control unit 7A can generate a predetermined torque at the reactionary shaft 41f that is interlocked with the first motor generator 40 by applying a load to the output electric power of the first motor generator 40. Additionally, it can generate torque T2d at the outlet shaft 4b by generating a predetermined torque at the reactionary shaft 41f.

Thus, as described above, as torque Tm is generated at the output shaft 5a of the second motor generator 5 and torque T2d is generated at the outlet shaft 4b, it is possible to generate torque T2=Tm+T2d, which is the sum of the two torques, at the output shaft 6 of the vehicle.

The engine 1 is controlled by the control unit 7A so as to operate intermittently. When the engine 1 that is adapted to operate intermittently is operating, the output power of the engine 1 drives the flywheel 3 and the input shaft 4a. As the input shaft 4a is driven, the output shaft 6 is driven consequently. On the other hand, when the engine 1 that is adapted to operate intermittently, is not operating, the output shaft 6 is driven to rotate only by the energy of the flywheel 3.

The pedaled quantity Acc of the accelerator pedal that is input to the control unit 7A is a signal generated in response to an operation of the accelerator pedal by the driver. The driver operates the accelerator pedal so that desired power may appear at the output shaft 6. More specifically, the driver controls the pedaled quantity Acc. Then, the control unit 7A outputs desired power to the output shaft 6 by controlling the fuel supply system 23, the clutch 2 and the electric power control unit in the control unit 7A according to a predetermined program in response to the pedaled quantity Acc of the accelerator pedal.

Now, the control method for controlling the operation of the flywheel energy accumulation/driving system having the above described configuration will be described below in greater detail.

(Characteristics of the Differential Gear 41 Alone)

Firstly, the characteristics of the differential gear 41 alone, which is generally illustrated in FIG. 2, will be described. If, for the differential gear 41, the rotational speed of the input shaft 4a is n1, the rotational speed of the outlet shaft 4b is n2 and the rotational speed of the reactionary shaft 41f is nr, whereas speed ratio $e = n2/n1$ and reactionary shaft speed ratio $er = nr/n1$ are defined and the speed ratio e under a condition where the rotational motion of the reactionary shaft 41f is constrained is ec (to be referred to as [critical speed ratio] ec hereinafter), the characteristics of the reactionary shaft speed ratio er are indicated by the solid line L1 or the broken line L2 in FIG. 4. As seen from the solid line L1 and the broken line L2, it is well known that the characteristics of the reactionary shaft speed ratio er are linear characteristics expressed by straight lines that pass point (e=1.0, er=1.0) without fail.

Figure 4:
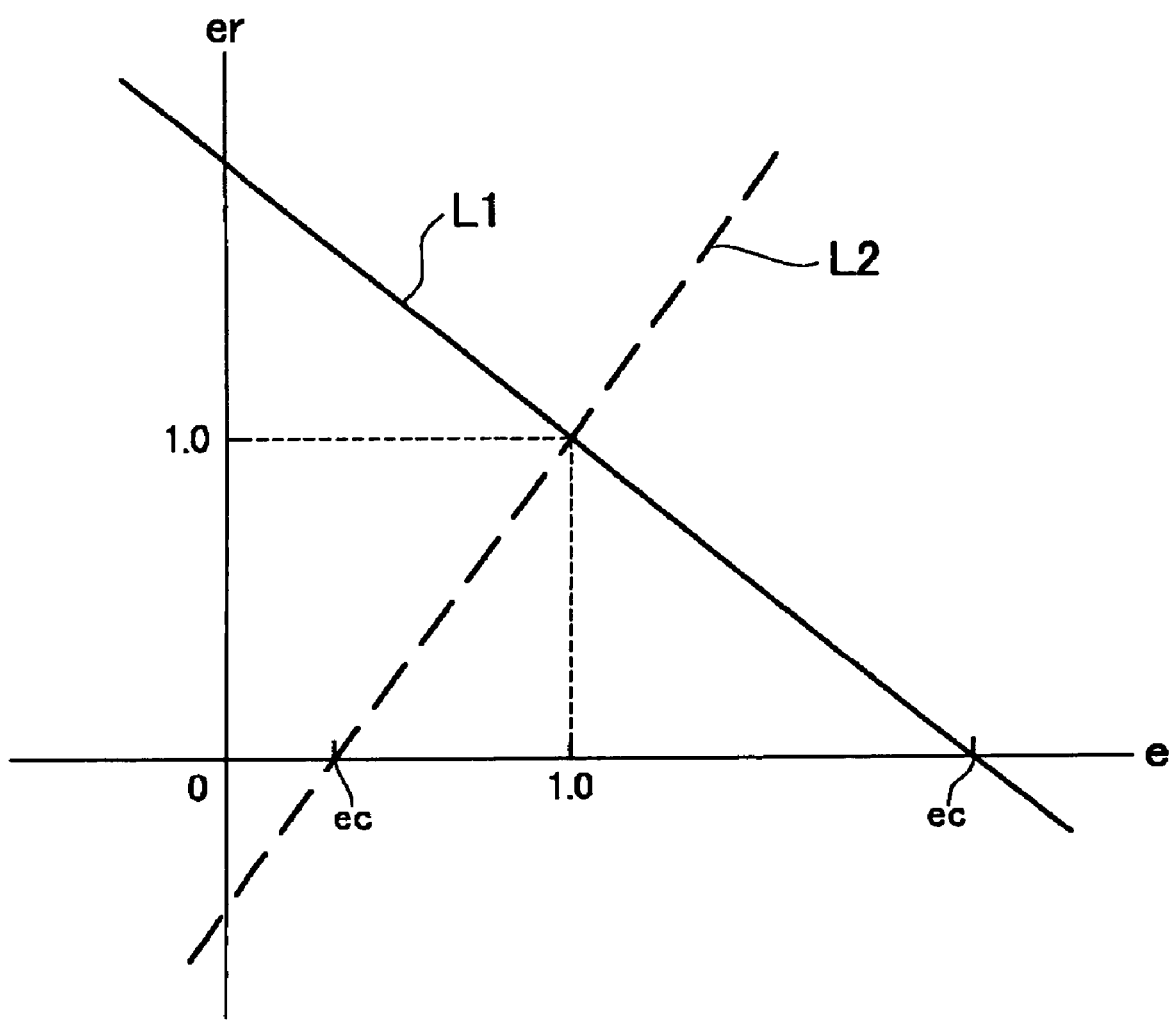
FIG. 4 is a graph illustrating the general characteristic of the differential gear of FIG. 2.

Referring to FIG. 4, the value of the critical speed ratio ec of the characteristics as illustrated by the solid line L1 when er=0 is determined as a function of the combination of the gears in the differential gear 41 that corresponds to the characteristics of the solid line L1 when ec>1.0. Similarly, the value of the critical speed ratio ec of the characteristics as illustrated by the broken line L2 when er=0 is determined as a function of the combination of the gears in the differential gear 41 that corresponds to the characteristics of the broken line L2 when ec<1.0. In other words, the value of the critical speed ratio ec can be selected freely by appropriately selecting the combination of the gears contained in the differential gear 41 (except when ec=1.0).

As will be understood from FIG. 4, the general characteristics of the reactionary shaft speed ratio er in FIG. 4 when the gears in the differential gear 41 are selected appropriately can be expressed by the formula (1) shown below.

$$er = (e-ec)/(1-ec) \qquad (1)$$

A given torque ratio exists among the input shaft 4a, the outlet shaft 4b and the reactionary shaft 41f because the gears in the differential gear 41 are interlocked and a given torque ratio is selected among the input shaft 4a, the outlet shaft 4b and the reactionary shaft 41f by the gear ratio of the interlocked gears.

Assume here that only the differential gear 41 is taken (and hence only the mechanism of the input shaft 4a, the reactionary shaft 41f, the outlet shaft 4b and the differential gear 41 is taken) in FIG. 2 and the torque at the input shaft 4a, the torque at the outlet shaft 4b and the torque at the reactionary shaft 41f are T1d, T2d and Trd respectively while the rotational angular speed of the input shaft 4a and that of the outlet shaft 4b are ω1 and ω2 respectively.

Also assume that the rotational motion of the reactionary shaft 41f is constrained and power is transmitted from the input shaft 4a to the outlet shaft 4b by way of the differential gear 41 with a power transmission efficiency of ηmo. Then, the differential gear 41 is a change gear (a speed-up gear or a reduction gear) of a predetermined gear ratio and the power at the input shaft 4a (T1d×ω1) and the power at the outlet shaft 4b (T2d×ω2) show a relationship of $$(T1d \times \omega 1) \times \eta mo = T2d \times \omega 2$$

or $$T2d = T1d \times (\omega 1/\omega 2) \times \eta mo.$$

Since $(\omega 1/\omega 2) = (n1/n2)$, the above formula can be rewritten so as to read as $$T2d = T1d \times (n1/n2) \times \eta mo.$$

Or, since n1/n2=1/e as pointed out above, the above formula can also be rewritten so as to read as $$T2d = T1d \times (1/e) \times \eta mo \qquad (2).$$

The speed ratio e in the formula (2) corresponds to a state where the rotational motion of the reactionary shaft 41f is constrained and hence is equal to the speed ratio e in a state where er=0 in the formula (1). When er=0, the speed ratio e in the formula (2) is e=ec and hence the formula (2) can be rewritten so as to read as $$T2d = T1d \times (1/ec) \times \eta mo \qquad (3).$$

In other words, in a state where the rotational motion of the reactionary shaft 41f is constrained, the differential gear 41 operates as a change gear showing a constant gear ratio of 1/ec.

While the formula (3) is led out for a state where the rotational motion of the reactionary shaft 41f is constrained, the input shaft 4a, the outlet shaft 4b and the reactionary shaft 41f are interlocked so as to show a predetermined torque ratio and a predetermined gear ratio for the differential gear 41 and hence the formula (3) holds true when all the input shaft 4a, the outlet shaft 4b and the reactionary shaft 41f are rotating.

Now, take a state where the rotational motion of the outlet shaft 4b is constrained. If power is transmitted from the input shaft 4a to the reactionary shaft 41f by way of the differential gear 41 with a power transmission efficiency of ηmr, the differential gear 41 operates as a change gear (a speed-up gear or a reduction gear) of a predetermined gear ratio. Then, relationship between the power at the input shaft 4a (T1d×ω1) and the power at the reactionary shaft 41f (Trd×ωr) is expressed as $$T1d \times \omega 1 \times \eta mr = Trd \times \omega r$$

or $$Trd = T1d \times (\omega 1/\omega r) \times \eta mr,$$

where ωr is the rotational angular speed of the reactionary shaft 41f.

Since (ω1/ωr)=(n1/nr) and n1/nr=1/er as pointed out above, the above formula can be rewritten so as to read as $$Trd = T1d \times (1/er) \times \eta mr \quad (4).$$

Since a state where the rotational motion of the outlet shaft 4b is constrained (e=0) is assumed for the formula (1), the speed ratio er of the reactionary shaft in the above formula (4) can be substituted by the value of er obtained by substituting e=0 in the formula (1) to obtain 1/er=(ec−1)/ec. Thus, the above formula (4) can be rewritten so as to read as $$Trd = T1d \times \{(ec-1)/ec\} \times \eta mr \quad (5).$$

Thus, when a state where the rotational motion of the outlet shaft 4b is constrained is assumed, the differential gear 41 operates as a change gear showing a predetermined gear ratio of (ec−1)/ec.

While the formula (5) is based on the assumption of a state where the rotational motion of the outlet shaft 4b is constrained, the gear ratio of the differential gear 41 is selected in such a way that the input shaft 4a, the outlet shaft 4b and the reactionary shaft 41f are interlocked so as to show a given torque ratio as in the case of the formula (3). In other words, the formula (5) holds true when the input shaft 4a, the outlet shaft 4b and the reactionary shaft 41f are all rotating.

Thus, the characteristics of only the differential gear 41 of FIG. 2 are described above.

(Mechanism of Power Transmission of FIG. 2)

Now, the mechanism of power transmission of the flywheel energy accumulation/driving system of FIG. 2 will be described by using the general formulas (1), (3) and (5) of the differential gear 41.

When the engine 1 is operated in a state where the clutch 2 is engaged, torque Te is produced at the drive shaft 3a by the engine 1 as described above by referring to FIG. 1. The torque Te is the sum of the flywheel torque Tf for accelerating the rotational motion of the flywheel 3 and the torque T1d for driving the input shaft 4a or $$Te = Tf + T1d,$$

which relationship can be differently expressed as $$Tf = Te - T1d \quad (6).$$

The formula (6) above shows that the torque Tf obtained by subtracting the torque T1d produced at the input shaft 4a from the engine torque Te produced at the drive shaft 3a is the component for accelerating the rotational motion of the flywheel 3. In other words, from the formula (6), the flywheel torque Tf is negative when the engine 1 is not operating or Te=0 and therefore the rotational speed Nf of the flywheel is decelerated by the load torque T1d of the input shaft 4a. Additionally, if the engine 1 is operating and Te<T1d in the formula (6), the rotational speed Nf of the flywheel is decelerated and the flywheel stalls.

The torque T1d in the formula (6) is produced when the control unit 7A causes the motor generator 40 to generate electric power. In other words, as the control unit 7A causes the motor generator 40 to generate electric power and produce load torque Trd at the reactionary shaft 41f, torque T1d and torque T2d are by turn produced respectively at the input shaft 4a and at the outlet shaft 4b as described above for the differential gear 41.

The torque T2d produced at the outlet shaft 4b is transmitted straight to the output shaft 6. Then, the power Emd produced at the outlet shaft 4b is part of the power at the input shaft 4a that is output to the outlet shaft 4b purely mechanically only by way of the gears in the differential gear 41.

The mechanical power Emd produced at the outlet shaft 4b is expressed by formula $$Emd = (T2d \times \omega 2) \quad (7)$$

and thus the formula shown below is obtained from the formulas (7) and (3)

$$Emd = T1d \times \omega 2 \times \eta mo/ec \quad (8).$$

The remaining power Eed at the input shaft 4a obtained by subtracting the power Emd that is output to the outlet shaft 4b from the total power of the input shaft 4a is input to the first motor generator 40 in order to cause the latter to generate electric power and expressed by the formula below:

$$Eed = Trd \times \omega r$$

where ωr is the rotational angular speed of the reactionary shaft 41f.

The input mechanical power Eed to be used for generating electric power is converted into electric power as a result of the power generating operation of the first motor generator 40, which electric power is totally applied to the second motor generator 5 in principle in the above described instance of basic control. Then, the electric power applied to the second motor generator 5 is converted back to mechanical power by the second motor generator 5 that operates as motor and the output power Eem of the second motor generator 5 is transmitted to the output shaft 6 by way of the drive shaft 5a and the gears 5b and 5c.

If the power transmission efficiency of transmitting the input mechanical power Eed of the first motor generator 40, which is equal to the output power of the second motor generator 5, to the output shaft 6 by way of the drive shaft 5a and the gears 5b and 5c is ηe and the torque by which the gear 5c drives the output shaft 6 by way of the gear 5b and by means of the power from the motor generator 5 is Tm, their relationship is expressed by the formula shown below.

$$Eed \times \eta e = Eem$$

Since Eed=Trd×ωr and Eem=Tm×ω2, $$Trd \times \omega r \times \eta e = Tm \times \omega 2.$$

When the two sides of the above formula are divided by the rotational angular speed ω1 of the input shaft 4a to rearrange the formula by using ωr/ω1=er and ω2/ω1=e, the formula (9) below is obtained.

$$Tm = Trd \times (er/e) \times \eta e \quad (9)$$

Furthermore, from the formulas (1), (5) and (9), the formula (10) below is obtained for Tm.

$$Tm = -T1d \times \{(e-ec)/(e \times ec)\} \times \eta e \times \eta mr \quad (10)$$

Since the torque T2 at the output shaft 6 is the sum of the torque T2d at the outlet shift 4b and the torque Tm from the motor generator 5, it is expressed by the formula (11) shown below.

$$T2 = T2d + Tm \quad (11)$$

By substituting T2d and Tm in the formula (11) respectively by the formulas (3) and (10) and rearranging the formula (11), the formula (12) below is obtained from the formula (11).

$$T2 = (T1d/ec) \times [\{\eta mo - (\eta mr \times \eta e)\} + \{(ec/e) \times \eta mr \times \eta e\}] \quad (12)$$

Then, from the formulas (5) and (12), the formula (13) shown below is obtained.

$$Trd = (ec-1) \times T2 \times mr / [\{\eta mo - (\eta mr \times \eta e)\} + \{(ec/e) \times \eta mr \times \eta e\}] \quad (13)$$

The speed ratio e is the ratio of the rotational speed n1 of the input shaft 4a to the rotational speed n2 of the outlet shaft 4b and hence the rotational speed Nf of the flywheel to the rotational speed N2 of the output shaft 6 or $$e = n2/n1 = N2/Nf.$$

As the above expression is used to substitute e in the formula (13), the formula (14) shown below is obtained.

$$Trd = (ec-1) \times T2 \times \eta mr / [\{\eta mo - (\eta mr \times \eta e)\} + \{(ec \times Nf/N2) \times \eta mr \times \eta e\}] \quad (14)$$

Meanwhile, when considering the gear path in the differential gear 41 from the input shaft 4a to the outlet shaft 4b and the gear path in the differential gear 41 from the input shaft 4a to the reactionary shaft 41f from the viewpoint of power transmission efficiency, they are more often than not approximately equal to each other. In other words, the approximation of ηmo=ηmr=ηm can be used for the above formulas. By using ηmo=ηmr=ηm, the formula (14) above can be rewritten so as to read as follows.

$$Trd = (ec-1) \times T2 / [(1-\eta e) + \{(ec \times Nf/N2) \times \eta e\}] \quad (14a)$$

The formula (14) means that basic control can be realized with the arrangement of FIG. 2 as in the case of FIG. 1 when currently the rotational speed of the output shaft 6 and the rotational speed of the flywheel are respectively N2 and Nf and the driver operates the accelerator pedal to indicate torque T2 to the output shaft 6 so that the control unit 7A selects power generating torque Trd for the motor generator 40 in response.

Additionally, from the formula (12) and e=N2/Nf, the formula (15) shown below is obtained for T1d.

$$T1d = (ec \times T2) / [\{\eta mo - (\eta mr \times \eta e)\} + \{ec \times (Nf/N2) \times \eta mr \times \eta e\}] \quad (15)$$

If the approximation of ηmo=ηmr=ηm is also used for the above formulas, the formula (15) above can be rewritten so as to read as follows.

$$T1d = (ec \times T2) / [\eta m \times [(1-\eta e) + \{(ec \times Nf/N2) \times \eta e\}]] \quad (15a)$$

The formula (15) means that torque T1d is produced at the input shaft 4a when currently the rotational speed of the output shaft 6 and the rotational speed of the flywheel are respectively N2 and Nf and the driver operates the accelerator pedal to indicate torque T2 to the output shaft 6 so that the control unit 7A operates for basic control.

It will be appreciated that the values of the power transmission efficiencies ηmo, ηmr and ηe in the formulas (14) and (15) may be experimentally determined in advance for each state and stored in the control unit 7A that performs arithmetic operations by using the formulas (14) and (15).

Additionally, the constant values may be used for ηmr, ηmo and ηe in the formula (14) for the purpose of simplicity. This is because the values of ηmr and ηmo are generally close to 1.0 and the value of ηe is generally found within a range of 0.7 and 0.9. On the basis of this consideration, the formula (14) can be rewritten by using ηmr=1.0, ηmo=1.0 and ηe is averagely 0.8 so as to read follows.

$$Trd = (ec-1) \times T2 / [0.2 + \{(ec \times Nf/N2) \times 0.8\}] \quad (14b)$$

Since both the output shaft 6 and the flywheel 3 have inertial force, the rotational speed N2 of the output shaft 6 and the rotational speed Nf of the flywheel 3 scarcely change during a minute period of time spent for the control operation that involves an arithmetic operation for the formula (14b) and the critical speed ratio ec is a constant value that is determined by the mechanism of the differential gear 41 as pointed out above. On the other hand, the torque T2 of the output shaft 6 that the driver indicates to the output shaft 6 can change remarkably and almost instantaneously. Thus, if the driver issues a command for increasing or decreasing the torque T2 of the output shaft 6 during a minute period of time spent for the control/arithmetic operations in which Nf and N2 in the formula (14b) scarcely change, the torque Trd of the reactionary shaft changes proportionally relative to the increase or decrease, whichever appropriate, of the torque T2.

It should be admitted that the formula (14b) lacks precision because constant values are selected for ηmr, ηmo and ηe in the formula (14) for the purpose of simplicity. However, the formula (14b) shows that when the control unit 7A causes the motor generator 40 to generate electricity and consequently produce torque Trd at the reactionary shaft 41f, the value of the torque T2 of the output shaft increases or decreases in proportion to the value of the Trd. In other words, as the control unit 7A produces torque Trd at the reactionary shaft 41f on the basis of the relationship defined by the formula (14b), torque T2 is produced at the output shaft 6, although it may be less accurate if compared with the torque obtained by using the formula (14).

What is important here is that when the driver operates the accelerator pedal, it does not mean that he or she indicates a specific value for the torque T2 at the output shaft 6 but it means that the driver simply wants to increase or decrease the torque at the output shaft 6. The formula (14b) meets the demand on the part of the driver.

This will be described in greater detail below. As the driver indicates torque T2, or "indicated torque T2, the control unit 7A causes the motor generator 40 to generate electricity by using the formula (14b) and consequently produce torque Trd at the reactionary shaft 41f. Then, the "actual torque T2" that is determined by substituting Trd in the formula (14) with the value determined from the formula (14b) is produced at the actual output shaft 6. Thus, when the formula (14b) is used, the "actual torque T2" shows a value slightly different from the value of the "indicated torque T2".

However, even if the "actual torque T2" shows a value slightly different from the "indicated torque T2", no problem arises in reality. This is because, when the driver increases or decreases the pedaled quantity for the acceleration or the deceleration, whichever appropriate, that the driver feels necessary, the actual torque T2 at the output shaft 6 is increased or decreased, whichever appropriate, proportionally so that the demand on the part of the driver is satisfactorily met. For this reason, constant values may safely be used for ηmr, ηmo and ηe in the formula (14) for the purpose of simplicity.

It is possible to realize basic control by means of a known flywheel energy accumulation/driving system as illustrated in FIG. 1 in a manner as described above by referring to FIG. 1 and it has been made clear by the above description that a flywheel energy accumulation/driving system illustrated in FIG. 2 that includes a differential gear 41 and a motor generator 40 can also realize basic control. In other words, the requirements to be met for a differential gear type flywheel energy accumulation/driving system to realize basic control has been made clear.

Also note that the mechanism of FIG. 2 that includes a differential gear 41 and a motor generator 40 operates as motor generator that generates electricity by relative revolutions of the input shaft 4a and the outlet shaft 4b like the motor generator 4 of FIG. 1.

(Control from the Input Shaft 4a to the Output Shaft 6 in FIG. 2)

Thus, the mechanism of power transmission of the arrangement illustrated in FIG. 2 is made clear above. Now, the basic control for the arrangement from the input shaft 4a to the output shaft 6 will be described below. The basic control is realized in a manner as described below by using the above formulas (14) and (15).

For the control operation that has to be conducted incessantly, the control unit 7A firstly detects the pedaled quantity Acc produced by the driver who operates the accelerator pedal. As the driver operates the accelerator pedal, it is possible to raise the output torque of the output shaft 6 only by means of the engine 1 until the pedaled quantity Acc gets to a predetermined level A0. However, as the pedaled quantity Acc exceeds the predetermined level A0, it is no longer possible to achieve the desired output level only by means of the output of the engine 1 so that the torque of the output shaft 6 has to be raised by supplying supplementary electric power to the second motor generator 5 from the power source 7 or some other battery. If the pedaled quantity Acc when it is at the level of the above described A0 is defined to be Acc=1.0 and the pedaled quantity Acc when it is released from the foot of the driver is defined to be Acc=0, Acc takes a value of 0<Acc<1.0 at any intermediary position of the accelerator pedal.

Figure 5:
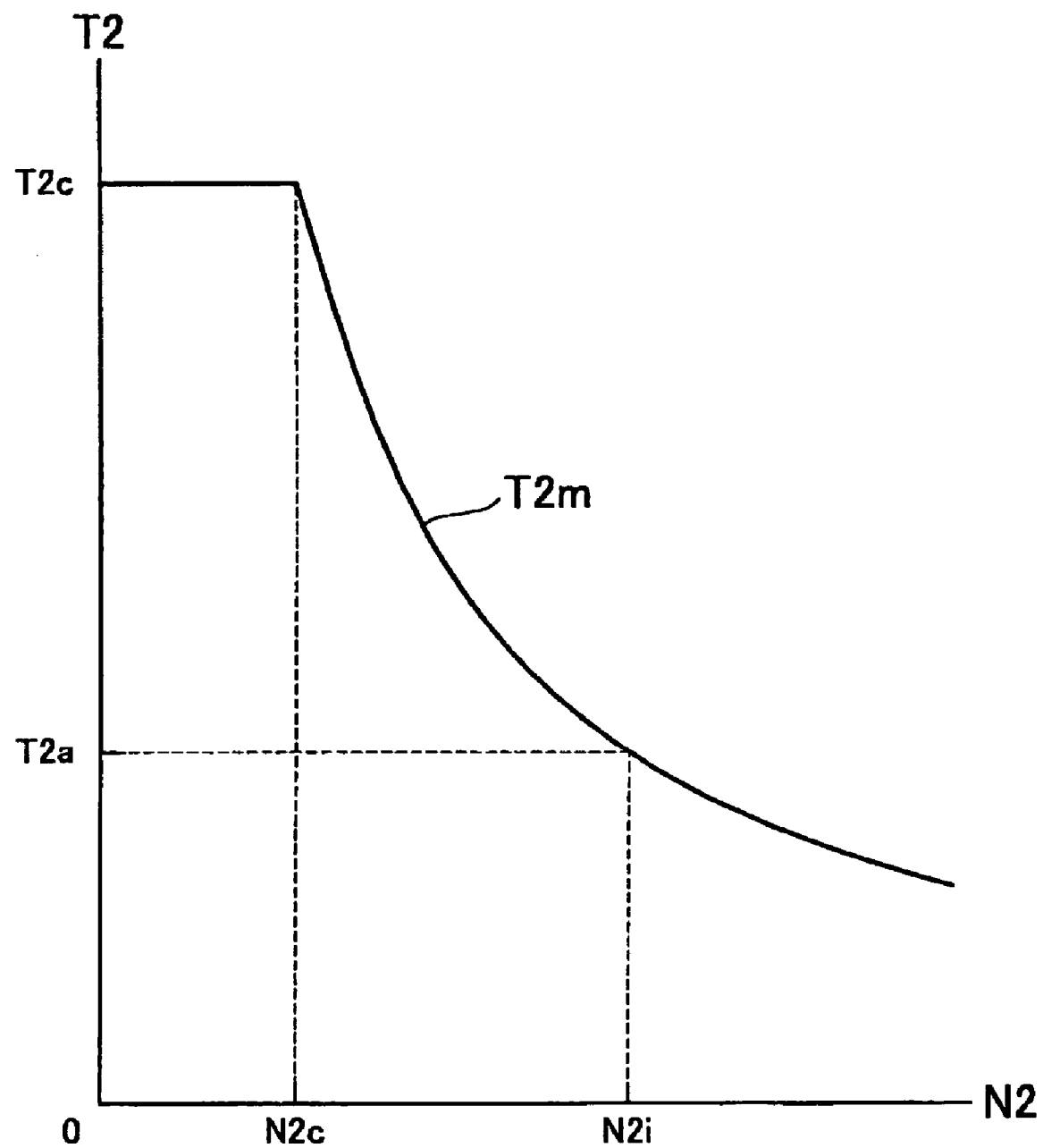
FIG. 5 is a characteristic curve illustrating the torque T2$m$ produced at an output shaft as a function of the rotational speed N2 of the output shaft when the pedaled quantity Acc of a corresponding accelerator pedal is made Acc=1.0 by the driver.

The control unit 7A of FIG. 2 determines the value of the output torque T2 to be selected for the output shaft 6 by arithmetic computations, using the characteristic curve illustrated in FIG. 5 and the detected value of the pedaled quantity Acc of the accelerator pedal. While the curve Tm2 of FIG. 5 will be described in greater detail hereinafter, FIG. 5 illustrates the characteristic of the tractive force drawing the vehicle when the pedaled quantity Acc of the accelerator pedal is Acc=1.0.

More specifically, in FIG. 5, the vertical axis represents the torque T2 of the output shaft 6 and the horizontal axis represents the rotational speed N2 of the output shaft 6. Torque T2 is held to a constant level, or T2=T2c, in the range of rotational speed of $0 \leq N2 < N2c$ as determined from the maximum climbing ability, whereas a substantially constant power characteristic is applied in the range of rotational speed of $N2 \geq N2c$. Note that, it will be appreciated that the curve T2m will be milder with a larger radius of curvature when the output power is perfectly constant.

When the pedaled quantity Acc produced by the driver who is operating the accelerator pedal is below the level of Acc=1.0, the control unit 7A is performing the following arithmetic operations. It detects the current rotational speed N2i of the output shaft 6 for the rotational speed N2 by means of an appropriate sensor and determines value of the torque T2a on the curve of the solid line T2m of FIG. 5 that corresponds to the detected rotational speed N2i. At the same time, the control unit 7A detects the current pedaled quantity Acc of the accelerator pedal being operated by the driver and determines the product of multiplication of the detected pedaled quantity Acc of the accelerator pedal and the value of the torque T2a on the curve T2m, or Acc×T2a. The product of T2=Acc×T2a is the value of the output torque T2 as currently indicted to the output shaft 6.

As the control unit 7A determines the output torque T2 in the range of $0 \leq Acc < 1.0$ of the pedaled quantity of the accelerator pedal by arithmetic computations, it then computationally determines the torque Trd to be produced at the reactionary shaft 41f by substituting T2 in the formula (14) with the value of the indicated output torque T2 and causes the motor generator 40 to generate electricity in order to produce the computationally determined torque Trd.

As for the relationship between the power generation of the first motor generator 40 and the torque Trd of the reactionary shaft 41f, if a DC generator is employed for the motor generator 40, the relationship should be such that the torque Trd can be controlled by controlling the output electric current of the DC generator. It is well known that the torque of the drive shaft of an electric generator or a motor can be controlled by controlling the output current.

The rotational speed N2 of the output shaft 6 and the rotational speed Nf of the flywheel in the formula (14) are the respective values detected when the accelerator pedal is operated, whereas the critical speed ratio ec is the value that is defined by the combination of the gears in the differential gear 41 that is used in FIG. 2 and the power transmission efficiencies ηmo, ηmr and ηe are the values that are experimentally determined and stored in the control unit 7A.

As the control unit 7A selects a value for the torque Trd of the reactionary shaft 41f, using the formula (14) as described above, the torque T2 to be indicated to the output shaft 6 that corresponds to the pedaled quantity Acc of the accelerator pedal at that time point is determined from the relationship of the formula (14) so that it is possible to set up the real drive torque T2 of the output shaft 6 according to the indication given by the driver. Then, as the torque Trd is produced at the reactionary shaft 41f, the torque T1d defined by the formula (15) is automatically produced at the input shaft 4a because of the above described torque ratio relationship among the reactionary shaft 41f, the input shaft 4a and the outlet shaft 4b coming out from the differential gear 41.

The torque T1d of the input shaft 4a establishes a balanced relationship with the engine torque Te and the flywheel torque Tf due to the relationship expressed by the formula (6). When the engine 1 is not operating, Te=0 should be used in the formula (16).

Of the control of operation from the input shaft 4a to the output shaft 6 by using the formulas (14) and (15), the arithmetic operations for determining the indicated torque T2 for the output shaft 6, the part of the control for causing the motor generator 40 to produce torque Trd at the reactionary shaft 41f according to the indicated torque T2 and the part of the control for setting up the real torque T2 for the output shaft 6 by controlling the motor generator 40 are necessary regardless if the engine 1 is operating or not.

(Control from the Engine 1 to the Input Shaft 4*a*)

Now, the control for the arrangement from the engine 1 to the input shaft 4*a* will be described below. The basic flow of this control is such that, when the rotational speed Nf of the flywheel 3 in FIG. 2 is decelerated and eventually gets to the lowest permissible rotational speed, which is the predetermined lower limit rotational speed Nfc, the control unit 7A supplies fuel to the engine 1 and causes engine torque Te to be produced at the drive shaft 3*a*, while keeping the clutch 2 in an engaged state, in order to reaccelerate the flywheel 3 without stalling it. This will be described more specifically below.

Figure 6:
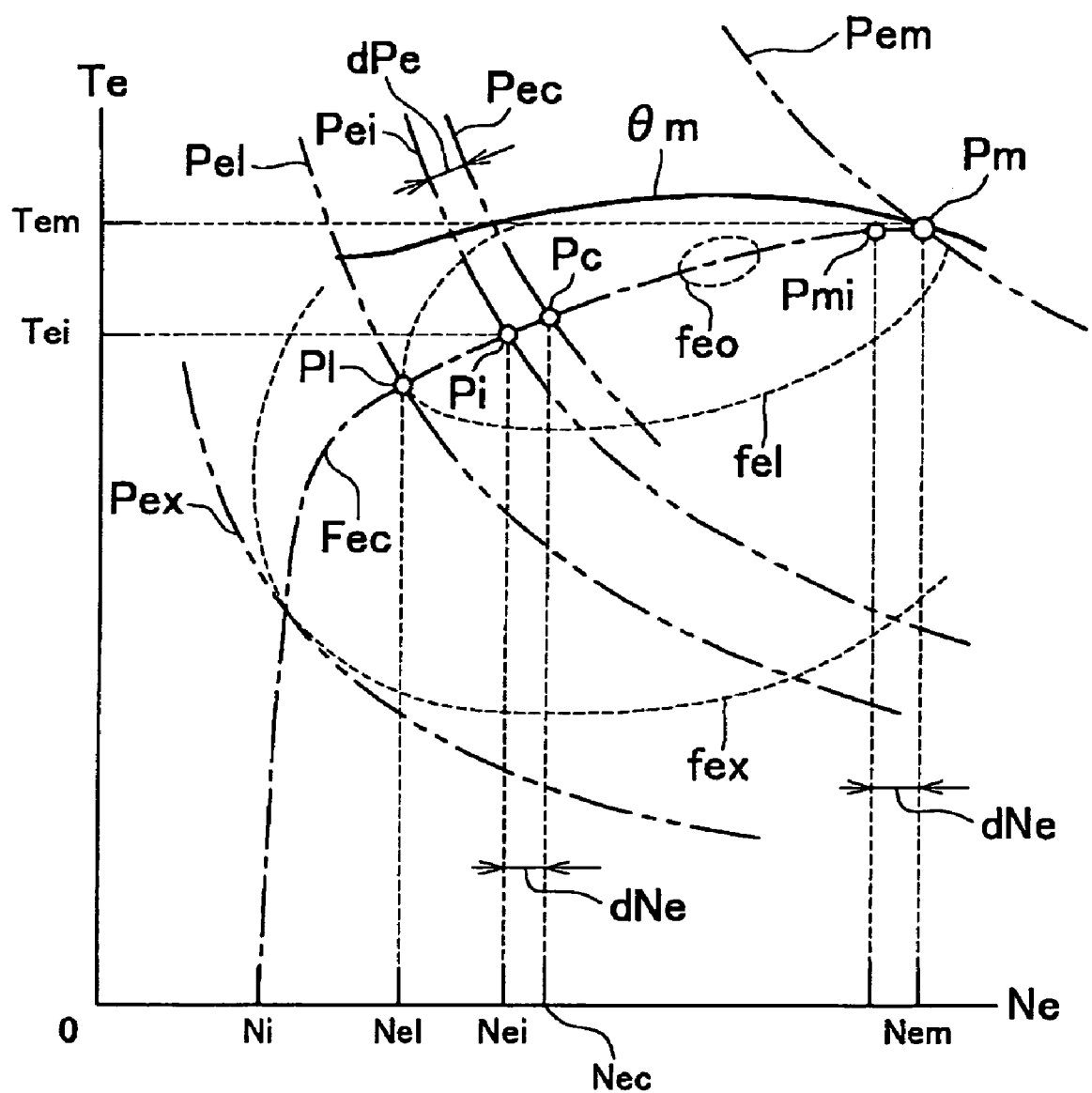
FIG. 6 is a graph illustrating characteristic curves of an engine that can be used in the systems of FIGS. 1 and 2.

FIG. 6 is a graph illustrating characteristic curves that is generally used to show the characteristics of a gasoline engine. It is possible to know the characteristics as illustrated in FIG. 6 by actually observing an engine 1 as illustrated in FIG. 2. It will be appreciated by seeing, for instance, FIG. 4 of Jpn. Pat. Appln. Laid-Open Publication No. 2001-298805 that the general characteristics of a fuel economizing characteristic curve Fec as shown in FIG. 6 is popularly known. In FIG. 6, the vertical axis represents the engine output torque Te and the horizontal axis represents the engine rotational speed Ne. In FIG. 6, Fec that is indicated by the dotted broken line shows the fuel economizing characteristic curve that provides the best specific fuel consumption for each output power of the engine 1 and θm shows the maximum output torque characteristics of the engine 1 under the condition that the fuel supply rate is maximized.

In FIG. 6, the characteristic curves Pem, Pec, Pei, Pel and Pex that are indicated respectively by the double-dotted broken lines are those along which the output power of the engine 1 is held to be constant. The curve Pem shows the largest output power. The output power falls from Pem, which provides the largest output power, in the order of Pec, Pei, Pel and Pex. The constant specific fuel consumption curves feo, fel, fex, of dotted lines are poorly economic at any point located outside and remote from the curve feo. The specific fuel consumption refers to the weight of the fuel consumed per unit output power per unit time.

Now, assume here that the clutch 2 of FIG. 2 is engaged. Then, the rotational speed of the drive shaft 3*a* is same as the rotational speed Ne of the engine 1 and also as the rotational speed Nf of the flywheel 3 and therefore it is possible to detect the rotational speed Ne of the engine 1 or the rotational speed Nf of the flywheel 3 by means of an appropriate sensor at each time period for control/arithmetic operations.

Referring to FIG. 6, if the current rotational speed Ne of the engine 1 is Ne=Nei, the control unit 7A operates to control the supply of fuel to the engine 1 in such a way that the engine torque Te is constantly held to Te=Tei at the intersection Pi of the current rotational speed of the engine, or Ne=Nei, and the fuel economizing characteristic curve Fec.

This control operation will be described more specifically below.

If the moment of inertia of the flywheel 3 is If and the rotational angular speed of the flywheel 3 is ωf, the flywheel torque Tf of the formula (6) is expressed as $$Tf=If \times (d\omega f/dt),$$

where (dωf/dt) is the rotational angular acceleration of the flywheel 3.

When the engine 1 is driving the flywheel 3 and if the rotational angular speed of the engine 1 is ωe, the relationship of ωf=ωe is held. Therefore, the above equation can be rewritten so as to read as $$Tf=If \times (d\omega e/dt)$$

or $$(d\omega e/dt)=Tf/If \qquad (16).$$

Then, the equation (17) below is led out from the formulas (16) and (6).

$$(d\omega e/dt)=(Te-T1d)/If \qquad (17)$$

Additionally, since the rotational angular speed ωe of the engine 1 is proportional to the rotational speed Ne of the engine 1, if the constant of proportion is K, the formula (17) can be rewritten so as to read as $$(dNe/dt)=K \times (Te-T1d)/If \qquad (18).$$

As the control unit 7A selects the generation torque Trd of the motor generator 40 according to the pedaled quantity Acc of the accelerator pedal, using the formula (14), the value of T1*d* in the formula (18) is automatically set to the value of the formula (15) as the value of the torque T1*d* at the input shaft 4*a* from the relationship of the torque ratio of each of the shafts (the reactionary shaft 41*f*, the input shaft 4*a* and the outlet shaft 4*b*) of the differential gear 41. Additionally, the moment of inertia If in the formula (18) is determined by the profile and the material of the flywheel.

It is clear from the formula (18) that the temporal change (dNe/dt) of the rotational speed Ne of the engine 1 at a given moment is determined by the value of the engine torque Te of the engine 1 when the torque T1*d* of the input shaft 4*a* is given for the same moment.

Since Nf=Ne so long as the engine 1 is driving the flywheel 3, (dNe/dt)=(dNf/dt) in the formula (18). In other words, as the engine 1 makes a full turn, the flywheel 3 turns with the same rotational speed changing rate. As the engine 1 is restarted to drive the flywheel 3, rotational energy is supplied to the flywheel 3. However, if the engine 1 is operating but Te<T1*d* takes place in the formula (18), (dNe/dt)=(dNf/dt) shows a negative value to give rise to a situation where the engine 1 cannot supply rotational energy enough for accelerating the rotational motion of the flywheel 3. Then, the flywheel 3 stalls.

In order to prevent the flywheel 3 from stalling, the control unit 7A performs a control operation of establishing the relationship of (dNe/dt)=(dNf/dt)>0. In other words, it performs a control operation of making (Te−T1*d*) of the right side of the formula (18) greater than 0, or (Te−T1*d*)>0. To be more accurate, the control unit 7A performs at least two control operations including (1) one for supplying fuel to the engine 1 so as to cause it to accelerate the rotational motion of the flywheel 3 when the rotational speed Nf of the flywheel 3 falls to the predetermined lower limit rotational speed Nfc and (2) one for starting the engine 1 to operate from the power level on the fuel economizing characteristic curve Fec under the condition of being capable of holding the above condition of (Te−T1*d*)>0 at the time of starting accelerating the rotational motion.

Additionally, after the engine 1 starts to operate in such a way, the control unit 7A raises the rate of supplying fuel to the engine 1 with time so that the engine 1 may keep on operating, while increasing its speed on the fuel economizing characteristic curve Fec. The control operation of raising the fuel supply rate so as to increase the rotational speed Ne of the engine 1 in such a way is a control operation of keeping the rotational speed of the engine 1 that is increasing in line with the rise of the fuel supply rate constantly to the fuel economizing characteristic curve Fec.

The relationship between the permissible lower limit rotational speed Nfc of the flywheel 3 and the timing of restarting the engine 1 will be described in greater detail hereinafter.

Thus, the control operation from the engine 1 to the input shaft 4a is described above.

(Necessity of Clutch 2)

Now, as for the necessity of the clutch 2, the clutch 2 is not inevitably necessary in the description given above by referring to FIGS. 2 and 1. This is because the clutch 2 is not required at all when the engine 1 is driving the flywheel 3 and it is sufficient that the drive shaft 1a and the drive shaft 3a are linked directly. When the fuel supply to the engine 1 is suspended and power is being taken out from the rotational energy of the flywheel 3 to the output shaft 6, the above basic control is feasible if the drive shaft 1a and the drive shaft 3a remain in the directly linked state because the engine 1 is driven only from the side of the drive shaft 3a.

However, when the fuel supply to the engine 1 is suspended and power is being taken out from the rotational energy of the flywheel 3 to the output shaft 6, the engine 1 follows the rotational motion of the drive shaft 3a so that a torque loss occurs as the engine 1 follows the rotational motion of the drive shaft 3a if the clutch is omitted.

(Problem of Interlocking of the Second Motor Generator 5 to the Drive Wheels)

The drive wheels 20, 20 interlocked with the output shaft 6 in FIG. 2 may be the front wheels or the rear wheels of the vehicle. As the second motor generator 5 is interlocked with the output shaft 6, it is also interlocked with the operation of driving drive wheels 20, 20 by way of the output shaft 6. While the second motor generator 5 drives the drive wheels 20, 20 being driven by the output shaft 6 in the instance of FIG. 2, the second motor generator 5 may alternatively be interlocked with some other drive wheels that are not being driven by the output shaft 6. The arrangement is substantially same as that of FIG. 2 in such an instance.

When the second motor generator 5 is interlocked with the drive wheels that are not interlocked with the output shaft 6, the value obtained by assuming that the second motor generator 5 is interlocked with the output shaft 6 as described below can be used as the value of the output torque T2 indicated by the pedaled quantity Acc of the accelerator pedal in the formulas (14) and (15).

When the second motor generator 5 is driving the output shaft 6 and if the drive torque of the drive wheels 20, 20 that are interlocked with the output shaft 6 is Tt and the rotational angular speed of the drive wheels 20, 20 is ωt, while the power transmission efficiency from the output shaft 6 to the drive wheels 20, 20 is ηme, the relationship between the power (T2×ω2) at the output shaft 6 and the power (Tt×ωt) at the drive wheels 20, 20 is expressed by $$(T2 \times \omega 2) \times \eta me = (Tt \times \omega t)$$

or $$T2 = Tt \times (\omega t/\omega 2)/\eta me$$

for both FIG. 1 and FIG. 2 and (ω2/ωt) is equal to the gear ratio id of the terminal reduction gear existing between the output shaft 6 and the drive wheels. Thus, the above formula can be rewritten so as to read as $$T2 = Tt/(id \times \eta me) \quad (19)$$

which represents a constant relationship.

On the other hand, when the second motor generator 5 is interlocked with drive wheels other than those that are interlocked with the output shaft 6, the output shaft torque T2 is determined from the overall torque T1 not only of the drive wheels 20, 20 but also of the other drive wheels by using the formula (19) and T2 may be used as the output torque T2 of the formula (14) or (15). More specifically, when the second motor generator 5 is interlocked with drive wheels other than the drive wheels 20, 20 that are interlocked with the output shaft 6, the sum of the drive torque Tt1 of the drive wheels 20, 20 that are driven by the output shaft 6 not interlocked with the second motor generator 5 and the drive torque Tt2 of the drive wheels that are driven by the second motor generator 5, or (Tt1+Tt2) may be used as drive torque Tt of the drive wheels in the formula (19) and the indicated torque T2 may be determined from the formula (19).

This means that, when the second motor generator 5 is interlocked with drive wheels other than the drive wheels 20, 20 that are interlocked with the output shaft 6, imaginary indicated torque T2 is determined from the formula (19), using Tt that is obtained by computing the above equation Tt=(Tt1+Tt2), and T2 in the formula (14) or (15) is substituted with the value of the imaginary indicated torque T2, assuming that the motor generator 5 is interlocked with the output shaft 6.

(How to Determine T2m in FIG. 5)

The indicated torque T2 that is used in the formulas (14) and (15) is computationally determined by the control unit 7A of FIG. 2. As described earlier, the control unit 7A computationally determines the indicated torque T2 to be produced at the output shaft 6, using the characteristic curve of FIG. 5, according to the pedaled quantity Acc of the accelerator pedal. The characteristic curve T2m in FIG. 5 illustrates the characteristic of the tractive force drawing the vehicle when the pedaled quantity Acc of the accelerator pedal is Acc=1.0. In other words, the characteristic curve T2m of FIG. 5 illustrates the tractive force characteristic of the largest force that can be given to the output shaft 6 only by means of the power of the engine 1 without supplying electric power from the power source 7 or the like to the second motor generator 5. When determining the output torque T2 in the formula (14) or (15), it is an important problem how to determine the value of T2m in FIG. 5 in advance. The method of determining the value of T2m in FIG. 5 will be described below.

As described earlier, torque T2 is indicated to the output shaft 6 by computationally determining the value of the indicated torque T2, using the formula of T2=Acc×T2m and referring to the characteristic curve of FIG. 5. This means that a command for outputting power that is expressed as the product of multiplication of the rotational angular speed ω2 of the output shaft 6 and the indicated torque T2, or (T2×ω2), at the time to the output shaft 6 and hence to the drive wheels 20, 20 is issued. Meanwhile, the source of power for outputting power to the output shaft 6 may be the engine 1 and/or some other power source (e.g., power source 7). In other words, the engine 1 and some other power source cover the indicated power (T2×ω2). However, it is only the engine 1 that can "regularly" supply the indicated power (T2×ω2) as power source.

The expression of "regularly" as used herein refers to that only the output power of the engine 1 can "keep on" driving the output shaft 6 without temporarily resorting to some other power source. For the above described basic control, if supplementary electric power is supplied from a battery or the like to the motor generator 5, the power (T2×ω2) becomes not regularly but "temporarily" a large power of "the power of the engine 1+the supplementary electric power". Thus, the expression of "regularly" means relying only on the power of the engine 1 away from any supplementary electric power.

If the engine 1 is driving the output shaft "regularly" and the pedaled quantity Acc of the accelerator pedal shows the above described predetermined value of Acc=1.0, only the engine 1 outputs all of its largest output power to the output shaft 6. If, on the other hand, the pedaled quantity Acc of the accelerator pedal is found in a rage exceeding the predetermined value Acc=1.0 (e.g., 1.0<Acc≦1.2), supplementary electric power from the battery and/or some other power source may be supplied to the drive wheels 20, 20 by way of the second motor generator 5 in addition to the power from the engine 1.

The largest output power of the engine 1 that is the "power source that can maintain the operation of regularly driving the output shaft" is preferably the largest power value in the range where the engine 1 can use the fuel supplied to it maximally efficiently. Therefore, if the pedaled quantity Acc of the accelerator pedal is Acc=1.0, it is necessary to make the output of the engine 1 to be found at the point of the largest output power Pm on the fuel economizing characteristic curve Fec in FIG. 6. In other words, the control operation should be such that the fuel supply to the engine 1 and the load torque Te at the drive shaft 3a are so controlled as to make the rotational speed Ne=Nem and the load torque Te=Tem for the engine 1 when the pedaled quantity Acc of the accelerator pedal is Acc=1.0.

For controlling the engine 1 so as to realize Ne=Nem and Te=Ten, the engine 1 should be so controlled as to realize T1d=Te=Tem and hence Tf=0 in the formula (6) for the relationship between the engine torque Te and the torque T1d at the input shaft 4a. Tf=0 in the formula (6) means that the torque Te of the drive shaft 3a and the torque T1d of the input shaft 4a are made to be equal to each other and the flywheel 3 is held in a state where the rotational motion of the flywheel is neither accelerated nor decelerated (or, constantly Ne=Nem).

Now, the method of computationally determining the T2m characteristic when Tld=Tem will be described below for the differential gear type flywheel energy accumulation/driving system of FIG. 2 and for the flywheel energy accumulation/driving system of FIG. 1 that does not use a differential gear.

(For the Differential Gear Type Flywheel Energy Accumulation/Driving System of FIG. 2)

Referring to FIG. 2, when the engine 1 outputs the largest power, the torque Te of the engine 1 is Te=Tem and the rotational speed Ne of the engine 1 is Ne=Nem. Under this condition, the engine 1 is driving the drive shaft 3a and hence the rotational speed Ne of the engine 1 is equal to the rotational speed Nf of the flywheel 3, or Nf=Ne=Nem.

Since T1d=Tem and Nf=Nem to meet the above requirements and the output torque T2 is T2=T2m, the formula (15) for determining the torque T1d of the input shaft 4a can be rearranged so as to read as follows.

$$T2m=(Tem/ec)\times[\{\eta mo-(\eta mr\times\eta e)\}+\{ec\times(Nem/N2)\times \eta mr\times\eta e\}] \quad (20)$$

If the approximation of ηmo=ηmr=ηm is assumed, the formula (20) can be rewritten as follows.

$$T2m=(Tem/ec)\times\eta m\times[(1-\eta e)+\{ec\times(Nem/N2)\times\eta e\}] \quad (20a)$$

In the formula (20), the efficiencies of ηmo, ηmr and ηe can be obtained by means of a test apparatus. The values of the efficiencies can be experimentally observed for each rotational speed N2 of the output shaft 6 by means of the test apparatus by selecting Nem and Tem respectively for the rotational speed and the torque of the input shaft 4a. Then, the characteristic curve T2m of FIG. 5 can be obtained by determining the largest output torque T2m by means of the formula (20) for each rotational speed N2 of the output shaft 6, using the efficiencies ηmo, ηmr and ηe as determined in the above described manner.

Thus, the method of computationally determining the value of T2m of FIG. 5 for the flywheel energy accumulation/driving system of FIG. 2 is described above.

(For the Flywheel Energy Accumulation/Driving System of FIG. 1 that does not Use any Differential Gear)

The large output torque T2m that the engine 1 can regularly output can also be determined for the flywheel energy accumulation/driving system of FIG. 1 that does not use any differential gear in a similar manner. A specific method of determining the T2m characteristic of FIG. 5 for the flywheel energy accumulation/driving system of FIG. 1 will be described below.

As pointed out above, the torque Te/i of the drive shaft 3a and the torque T1i of the input shaft 4a show the relationship of the formula (a), or Tf=(Te/i)−T1i, when the clutch 2 is engaged and the energy 1 is held in the operating condition in FIG. 1. Then, the relationship that needs to be established for the engine 1 to output the largest power (Tem×ωem) and for the torque Tf of the flywheel to show a value of Tf=0 is obtained to be T1i=Te/i=Tem/i from the formula (a) and the rotational speed Nf of the drive shaft 3a shows a relationship of Nf=(Nem×i).

Of the above relationships, the formula of FIG. 1 that corresponds to the above formula (15) also corresponds to the formula (b). Thus, T2=T2m when the engine 1 outputs the largest power (Tem×ωem) and hence the formula (21) below is obtained by using the above described relationships of T1i=Tem/i and Nf=(Nem×i) as substitutes in the formula (b) and rearrange the latter.

$$T2m=(Tem/i)\times[1+\{(Nem\times i/N2)-1\}\times\eta e] \quad (21)$$

In other words, it is possible to obtain characteristic T2m as in the case of FIG. 5 for the flywheel energy accumulation/driving system of FIG. 1 by computationally determining the output torque T2m, using the formula (21), for each rotational speed N2 of the output shaft 6.

(Method of Experimentally Determining T2m)

The T2m characteristic is computationally determined by using the formula (20) or (21) for the flywheel energy accumulation/driving system of FIG. 2 or FIG. 1, whichever appropriate, in the above description. However, the T2m characteristic can be determined experimentally. More specifically, the engine 1 is held in a state where it is driven to operate at the largest power working point Pm in FIG. 6 and the torque T2 of the output shaft 6 is experimentally observed for each rotational speed N2 of the output shaft 6 within the range of N2c≦N2≦N2max and plotted on the graph of FIG. 5.

The above-described N2max is the rotational speed of the output shaft 6 that corresponds to the highest moving speed of the vehicle. As pointed out above, the value of the output torque T2=T2c when the rotational speed N2 of the output shaft 6 is within the range of 0≦N2<N2c corresponds to the largest climbing ability. Thus, the value of T2m can be determined experimentally in the described manner.

To summarize the above, to determine the output torque T2m when the pedaled quantity Acc of the accelerator pedal is Acc=1.0 and the rotational speed N2 of the output shaft 6 is within the range of N2c≦N2≦N2max is an operation as described below both when it is computationally determined by using the formula (20) or (21) and when it is experimentally determined in a manner as described above.

Namely, when the engine 1 is set to the largest power working point Pm and the flywheel torque Tf is set to Tf=0 (in other words, a state where the rotational speed Ne of the engine is held to the constant level of Ne=Nem and the flywheel 3 is not accelerated) so as to transmit the largest output power Pem from the engine 1 to the output shaft 6, the output torque T2=T2m at the output shaft 6 for each rotational speed N2 is determined after subtracting the power transmission loss from the input shaft 4a to the output shaft 6 and the obtained output torque T2m is used when the pedaled quantity Acc of the accelerator pedal is equal to 1.0, or Acc=1.0.

When the pedaled quantity Acc of the accelerator pedal is equal to 1.0, or Acc=1.0, the engine 1 keeps on operating without accelerating the rotational motion of the flywheel 3 (and hence keeping the flywheel torque Tf=0) and outputs the largest output power Pem straight to the output shaft 6.

Thus, the specific method for determining T2m at Acc=1.0 by means of the arithmetic formula or a test is described above.

(Control for Intermittently Driving the Engine 1 when the Pedaled Quantity Acc of the Accelerator Pedal is $0 \leq Acc \leq 1.0$)

When the pedaled quantity Acc of the accelerator pedal is $0 \leq Acc < 1.0$, the control unit 7A makes the engine 1 operate intermittently. Now, the control operation for intermittently driving the energy 1 will be described below.

To begin with, if the engine 1 stops when it is driven to operate intermittently, the rotational energy that the flywheel 3 has is used to drive the output shaft 6. The power required for the output shaft 6 under this condition is the product of multiplication of the indicated torque T2 that utilizes the pedaled quantity Acc of the accelerator pedal, or T2=Acc× T2m, and the rotational angular speed ω2 of the output shaft 6 at this time, or T2×ω2. Therefore, when the engine 1 is not operating, the rotational energy that the flywheel 3 has at any time should be enough for meeting the power required T2×ω2 of the output shaft 6 at that time.

Additionally, when the engine 1 stops and the output shaft 6 is driven only by the rotational energy that the flywheel 3 has, the rotational energy of the flywheel 3 is being consumed to drive the output shaft 6 and hence keeps on decreasing. Therefore, in order to keep on driving the vehicle, rotational energy has to be sometime supplied to the flywheel 3 whose rotational energy keeps on decreasing.

(How to Determine the Lower Limit Rotational Speed Nfc of the Flywheel)

When rotational energy has to be supplied to the flywheel or at what level the lower limit rotational speed of the flywheel 3 is to be defined will be discussed below. Note that, in the following description, the rotational speed Nf of the flywheel 3 when the engine 1 starts supplying rotational energy to the flywheel 3 is referred to as flywheel lower limit rotational speed Nfc. Additionally, it is assumed that the multiplying device 1A is omitted and the drive shaft 1a is directly linked to the drive shaft b in the following description.

In FIG. 1 or FIG. 2, when the rotational speed of the flywheel 3 falls to the lower limit rotational speed Nfc and the engine 1 starts driving the flywheel 3, the rotational speed Ne of the engine 1 needs to be Ne=Nfc because the engine 1 is directly linked to the flywheel 3. In other words, for the engine 1 to start driving the flywheel 3, it is so controlled that the clutch 2 is brought into engagement exactly when the rotational speed Ne of the engine 1 is made to agree with the flywheel lower limit rotational speed Nfc and then the engine 1 is made to start driving the flywheel 3. Note that the time when the rotational speed Ne of the engine 1 is made to agree with the flywheel lower limit rotational speed Nfc is referred to as "time of concurrence" herein.

The operation of the engine 1 at the time of concurrence when the engine 1 starts driving the flywheel 3 should be found on the fuel economizing characteristic curve Fec of FIG. 6 and the output power level of the engine 1 at the time of concurrence should be such that it can accommodate the power T2×ω2 required for the output shaft 6 and the supplementary power required to accelerate the rotational motion of the flywheel 3 to rotate.

However, for the convenience of explanation, it is assumed here that, when the engine 1 starts operating at the time of concurrence, the engine 1 does not have any supplementary power that can be used to accelerate the rotational motion of the flywheel 3 and hence the output power of the engine 1 is equal to the power required for the output shaft 6. It is also assumed here that the rotational speed Nf of the flywheel 3 is Nf=Nf0 at the assumed time of concurrence. Note that, when the engine 1 does not have any supplementary power that can be used to accelerate the rotational speed of the flywheel 3 at the time of concurrence, the latter is referred to as "lowest marginal time of concurrence" herein.

Now, the lowest marginal time of concurrence will be discussed below. At the lowest marginal time of concurrence, when the rotational speed Ne of the engine 1 agrees with the rotational speed Nf=Nf0 of the flywheel 3, Ne=Nf0.

Considering that all the power of the energy 1 is output to the output shaft 6, the output power Te×ωe of the engine 1 and the power required for the output shaft 6, T2×ω2 show a relationship as defined by the formula (22) below at the lowest marginal time of concurrence.

$$Te \times \omega e = T2 \times \omega 2 \quad (22)$$

Since the output torque T2 is the product of the pedaled quantity Acc of the accelerator pedal and the largest output torque T2m, or T2=Acc×T2m, the formula (22) can be rewritten so as to read as follows.

$$Te \times \omega e = Acc \times (T2m \times \omega 2) \quad (23)$$

(T2m×ω2) in the above formula (23) corresponds to the power that is produced at the output shaft 6 when all the largest output power Pem of the engine 1 in FIG. 6 is output to the output shaft 6 and Acc=1.0. Therefore, when an arbitrarily selected value is given to Acc ($0 \leq Acc \leq 1.0$) in the formula (23) and if the engine 1 outputs power (Te×ωe) at the level equal to the product of the largest output power Pem multiplied by Acc, it is possible to output power of the level equal to the product of the power (T2m×ω2) that the engine 1 outputs to the output shaft 6 at the time of outputting the largest power multiplied by Acc to the output shaft 6.

Additionally, when the pedaled quantity Acc of the accelerator pedal shows an arbitrarily selected value ($0 \leq Acc \leq 1.0$) at the lowest marginal time of concurrence and if the largest output power of the engine 1 is Pem, it is sufficient for the output power Pei of the engine 1 that is operating along the fuel economizing characteristic curve Fec of FIG. 6 to show the relationship as defined by the formula (24) below at the working point Pi.

$$Pei = Acc \times Pem \quad (24)$$

Additionally, when the pedaled quantity Acc of the accelerator pedal shows an arbitrarily selected value ($0 \leq Acc \leq 1.0$) and the output power of the engine 1 is Pei, the rotational speed Ne of the engine 1 is Ne=Nei (FIG. 6). Note that the output power Pei of the engine 1 on the fuel economizing characteristic curve Fec of FIG. 6 is a function of the rotational speed Ne of the engine 1. This means that when the output power Pe of the engine 1 shows an arbitrarily selected value, or Pe=Pei, the rotational speed Ne of the engine 1 is Ne=Nei as seen from FIG. 6.

Figure 7:
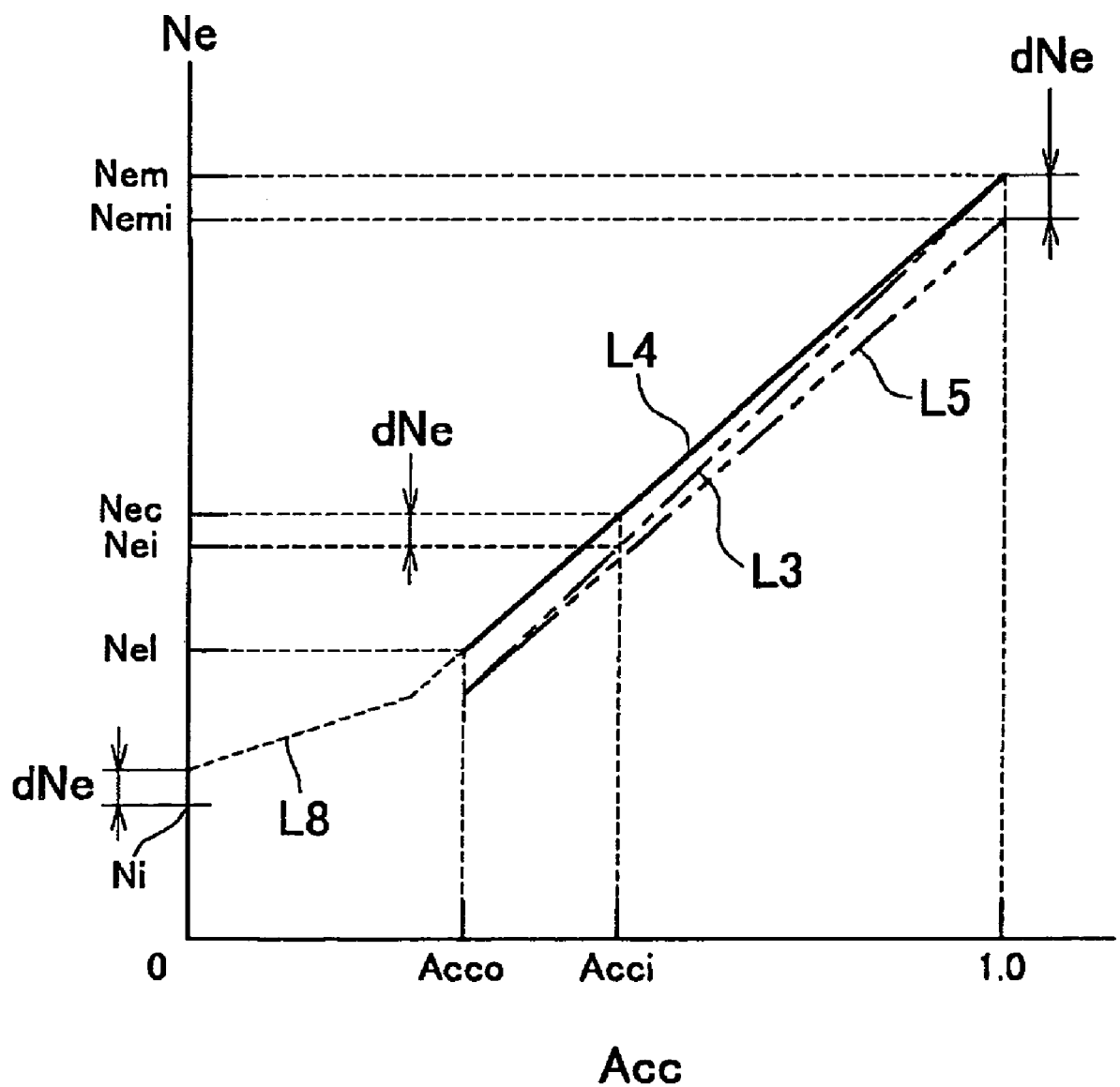
FIG. 7 is a graph illustrating characteristic curves showing the relationship between the rotational speed Ne of an engine and the pedaled quantity Acc of a corresponding accelerator pedal when the rotational speed Nf of a flywheel and the rotational speed Ne of the engine are made to agree with each other at the time of restarting the engine from a state where an output shaft is driven only by the rotational energy of the flywheel.

Thus, the relationship between the rotational speed Ne=Nei when the output power Pe of the engine 1 is Pe=Pei at the lowest marginal time of concurrence and the Acc of the formula (24) when Pe=Pei is expressed by the characteristic curve of the double-dotted broken line L3 in FIG. 7. In FIG. 7, Ne=Nem indicates the rotational speed of the engine 1 when the engine 1 outputs the largest power Pem (FIG. 6).

When Ne=Nei is determined in advance for each value of Acci that the pedaled quantity Acc of the accelerator pedal can take from the characteristic curve of the double-dotted broken line L3 in FIG. 7 and the rotational speed Nf of the flywheel 3 that is being decelerated comes to agree with the value of Nei that is determined in advance, the time point when they agree with each other is the lowest marginal time of concurrence for a given pedaled quantity Acc.

According to the assumption made when defining the lowest marginal time of concurrence above, when the pedaled quantity Acc of the accelerator pedal is equal to an arbitrarily selected value, or Acc=Acci, at the lowest marginal time of concurrence, the engine 1 can only output power of the level that corresponds to the Acci to the output shaft 6 and does not have any supplementary power that can be used to accelerate the rotational motion of the flywheel 3. Therefore, when the pedaled quantity Acc of the accelerator pedal is equal to an arbitrarily selected value, or Acc=Acci, for the engine to be able to output power of the level that corresponds to the Acci to the output shaft 6 and additionally have supplementary power that can be used to accelerate the rotational motion of the flywheel 3, it is sufficient to select a time point when the engine 1 can output power of a level slightly higher than the level of output power at the lowest marginal time of concurrence as "true time of concurrence".

In FIG. 7, the solid line L4 is the characteristic curve obtained by adding a given additional value dNe to the characteristic curve of the double-dotted broken line L3 for the above described relationship that the output power of the engine 1 is at a level slightly higher than the level of output power at the lowest marginal time of concurrence. By comparing the characteristic curve of the double-dotted broken line L3 and the characteristic curve of the solid line L4, it will be seen that the additional value dNe is largest for Acc=Acco and dNe=0 for Acc=1.0, dNe being gradually decreasing in between as a function of the Acc.

It will be appreciated that dNe may not necessarily be defined as a function of Acc and may alternatively be defined as a constant value. When dNe is defined as a constant value, it can be defined in a manner as described below.

As pointed out above, the characteristic curve of the double-dotted broken line L3 in FIG. 7 is obtained by determining the relationship between each possible value of Acc and the corresponding rotational speed Ne (FIG. 6) of the engine 1 that is outputting power on the basis that the output power (Tex$\omega$e) of the engine 1 that is operating along the fuel economizing characteristic curve Fec of FIG. 6 is equal to (Acc×Pem) of the formula (24). Note that the working point of the engine 1 for Acc=1.0 is indicated as point Pm in FIG. 6.

On the other hand, when determining the lowest marginal time of concurrence and selecting a constant value for dNe, the working point of the engine 1 for Acc=1.0 is lowered from point Pm (true largest power output point) on the fuel economizing characteristic curve Fec in FIG. 6 to point Pmi (imaginary largest power output point) to obtain the characteristic curve of the triple-dotted broken line L5 in FIG. 7, following the procedure used for obtaining the double-dotted broken line L3.

This means that, while point Pm in FIG. 6 is the working point for the rotational speed Nem of the engine 1, point Pmi is the working point for the rotational speed equal to the rotational speed Nem less dNe (e.g., about 100 rpm) on the fuel economizing characteristic curve Fec. This also means that while Ne=Nem at Acc=1.0 on the double-dotted broken line L3 in FIG. 7, Ne=(Nem−dNe) at Acc=1.0 on the triple-dotted broken line L5 in FIG. 7. In short, the triple-dotted broken line L5 is differentiated from the double-dotted broken line L3 by displacing the largest power output only by dNe on the fuel economizing characteristic curve Fec at Acc=1.0 in FIG. 7.

The above description that the triple-dotted broken line L5 is differentiated from the double-dotted broken line L3 by displacing the largest power output only by dNe on the fuel economizing characteristic curve Fec at Acc=1.0 by turn means that, if the triple-dotted broken line L5 of FIG. 7 is used to determine the lowest marginal time of concurrence, the largest output power of the engine 1 is reduced only slightly from the largest output power for the double-dotted broken line L3 and all the requirements of the lowest marginal time of concurrence (two requirements including one that the output power of the engine 1 should meet the power required for the output shaft 6 that corresponds to the pedaled quantity Acc of the accelerator pedal and one that the engine 1 does not have any supplementary power for accelerating the rotational motion of the flywheel 3) are met.

Thus, the characteristic curve (true time of concurrence characteristic curve) obtained by adding the constant value dNe to the characteristic curve of the triple-dotted broken line L5 is expressed by solid line L4 in FIG. 7 and the working point Pm on the characteristic curve of the solid line L4 where the rotational speed Ne of the engine 1 is Ne=Nem for Acc=1.0 is also found on the fuel economizing characteristic curve Fec. Thus, how to determine the true time of concurrence with a constant value of dNe is described above.

It should be additionally noted here that the characteristic curve of the solid line L4 obtained by adding dNe to the double-dotted broken line L3 or the triple-dotted broken line L5 means the following. Firstly, the characteristic curve of the double-dotted broken line L3 or that of the triple-dotted broken line L5 shows the relationship that the rotational speed Ne of the engine 1 is Ne=Nei at the working point Pi of the engine 1 at the lowest marginal time of concurrence (see FIG. 6) if the lowest marginal time of concurrence is determined for any given pedaled quantity Acc of the accelerator pedal. Additionally, the working point Pi is always found on the fuel economizing characteristic curve Fec.

On the other hand, the addition of dNe to the characteristic curve of the double-dotted broken line L3 or the triple-dotted broken line L5 means that the working point of the engine 1 is moved from point Pi to point Pa on the fuel economizing characteristic curve Fec of FIG. 6 and the move of the working point of the engine 1 from point Pi to point Pc means that the output power of the engine 1 is increased by dPe from the power Pei at the working point Pi.

As may be clear from the above description, the characteristic curve of the solid line L4 in FIG. 7 is used to determine the true time of concurrence. More specifically, Ne=Nec is determined in advance from the solid line L4 of FIG. 7 for any arbitrarily selected value of Acci given for the pedaled quantity Acc of the accelerator pedal and the time "when the rotational speed Nf of the flywheel 3 that is being decelerated comes to agree with the value of Nec" is specified as true time of concurrence.

The relations between the characteristic curve of the double-dotted broken line L3 or the triple-dotted broken line L5 for the lowest marginal time of concurrence and the characteristic curve of the solid line L4 (for the true time of concurrence) obtained by adding dNe to the characteristic curve are described above. Now, the characteristic curves illustrated in FIG. 8 will be described below.

Figure 8:
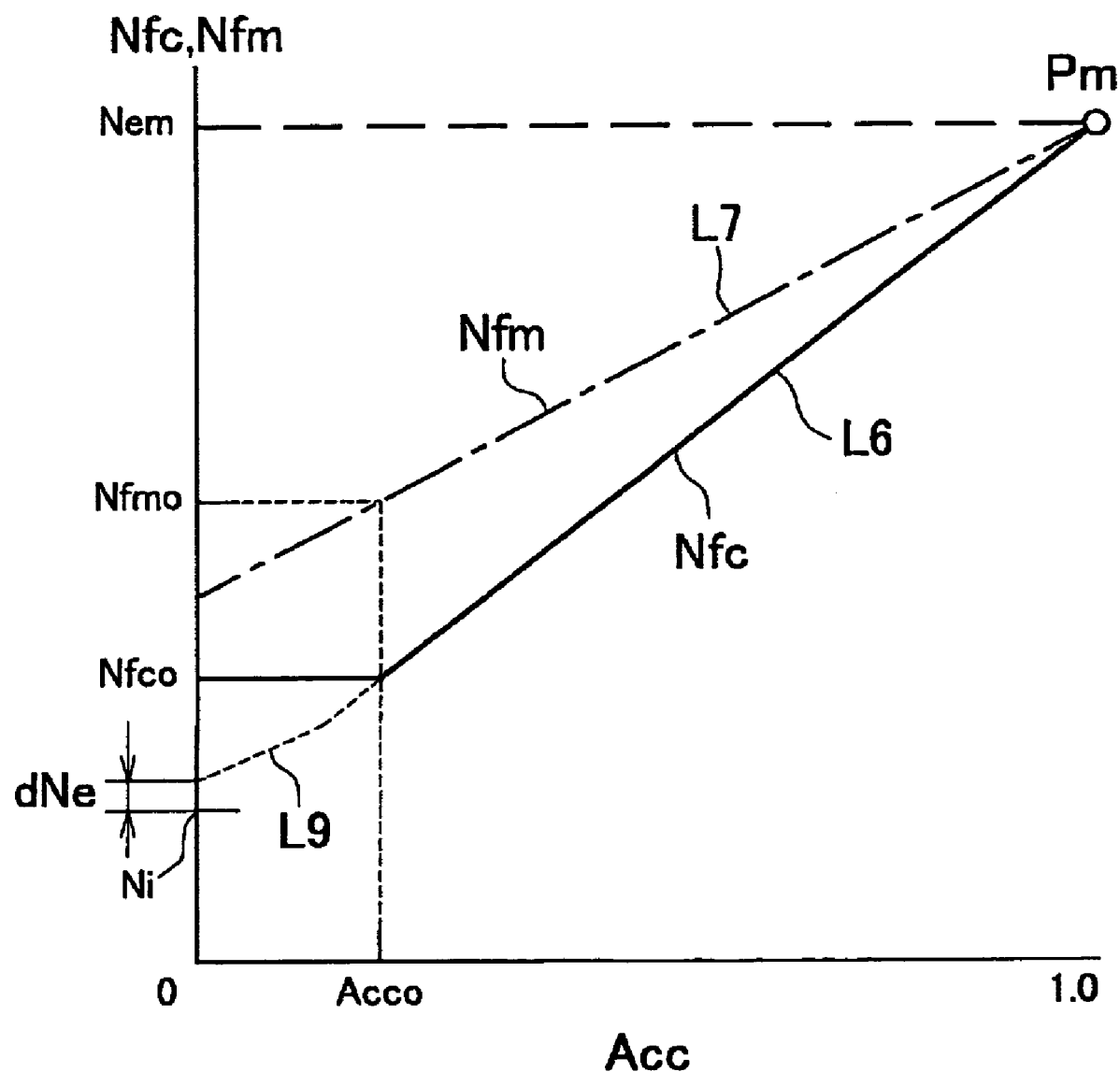
FIG. 8 is a graph illustrating characteristic curves showing the relationship between the lower limit rotational speed Nfc of a flywheel and the pedaled quantity Acc of a corresponding accelerator pedal and the relationship between the upper limit rotational speed Nfm of the flywheel and the pedaled quantity Acc of the accelerator pedal.

The characteristic curve Nfc of curved line L6 in FIG. 8 is drawn by using Nec when "the rotational speed Nf of the flywheel 3 that is being decelerated comes to agree with the value of Nec" for the lower limit rotational speed Nfc of the flywheel 3. In other words, the Nfc curved line L6 in FIG. 8 is drawn by using the characteristic curve of the solid line L4 in FIG. 7.

In FIG. 8, the horizontal axis represents the pedaled quantity Acc of the accelerator pedal and the vertical axis represents the lower limit rotational speed Nf=Nfc of the flywheel 3 at the true time of concurrence. The Nfc characteristic curve L6 of FIG. 8 may be stored in the control unit 7A of FIG. 2.

Thus, the following processing operation is conducted when determining the true time of concurrence while power that corresponds to the pedaled quantity Acc of the accelerator pedal is being output to the output shaft 6 only by means of the rotational energy of the flywheel 3. As the rotational speed Nf of the flywheel 3 is reduced and gets to the level of Nfc that corresponds to the pedaled quantity Acc of the accelerator pedal, the rotational speed Ne of the engine 1 is made to agree with the lower limit rotational speed Nfc of the flywheel 3 (the rotational speed Ne of the engine 1 is so controlled as to agree with the lower limit rotational speed Nfc of the flywheel 3 to be more accurate) on the fuel economizing characteristic curve Fec and the clutch 2 is brought into engagement to restart the engine 1 when Ne=Nfc is reached.

When the pedaled quantity Acc of the accelerator pedal falls below a predetermined low pedaled quantity Acco of the accelerator pedal in FIG. 8, the lower limit rotational speed Nfc of the flywheel 3 is held to a constant value of Nfco. Nfco indicates that the engine 1 restarts from point P1 on the fuel economizing characteristic curve Fec at the true time of concurrence and the rotational speed Ne of the engine 1 is Ne=Nel=Nfco when the engine 1 restarts from the point P1.

That the lower limit rotational speed Nfc of the flywheel 3 is held to a constant value when the pedaled quantity Acc of the accelerator pedal falls below a predetermined low pedaled quantity Acco of the accelerator pedal means the following. When the output power Pe of the engine 1 becomes Pe<Pel on the fuel economizing characteristic curve Fec of FIG. 6, the efficiency of the engine 1 rapidly falls toward the rotational speed Ni of the engine 1 for idling. For this reason, the operating range of the output power Pe of the engine 1 is limited to a range of Pem≧Pe≧Pel where the fuel efficiency is high on the fuel economizing characteristic curve Fec and the rotational speed Ne of the engine 1 is Ne=Nel=Nfco at the lowest power level Pel in the above range of Pem≧Pe≧Pel. In other words, the low pedaled quantity Acco of the accelerator pedal is a pedaled quantity where the fuel efficiency of the engine 1 starts falling rapidly.

The specific value of Pel on the fuel economizing characteristic curve Fec depends on the engine design of each type and differs from type to type so that it cannot be unequivocally defined.

While the operation of the engine 1 is limited to the above cited range of Pem≧Pe≧Pel in the above described embodiment, the control of the operation of the engine 1 is not limited to the range of Pem≧Pe≧Pel for the purpose of the present invention. For example, the range of Pem≧Pe≧0 that uses all the fuel economizing characteristic curve Fec may be selected for the operation of the engine 1. The reason for this is the requirements for restarting the engine 1 at the lower limit rotational speed Nfc of the flywheel 3 are met if the range of Pem≧Pe≧0 is selected for the operation of the engine 1. The reason for this will be described in detail below.

When the rotational speed of the flywheel 3 gets to the lower limit rotational speed Nfc and the engine 1 starts operating at the time when the rotational speed of the flywheel 3 gets to Nfc, the engine 1 has the power that is the sum of the power (Acc×Pem) required for the output shaft 6 in response to the pedaled quantity Acc of the accelerator pedal and the supplementary power that can be used to accelerate the rotational motion of the flywheel 3. Therefore, when the pedaled quantity Acc of the accelerator pedal is being reduced toward nil, the power required for the output shaft 6 that is computationally determined by the control unit is also falling toward nil in response to the pedaled quantity Acc of the accelerator pedal.

When the power required for the output shaft 6 is being reduced to toward nil, the output power of the engine 1 that is the power source of the output shaft 6 is also being reduced toward nil with a slight amount of supplementary power that can be used to accelerate the rotational motion of the flywheel 3. Therefore, the requirements that need to be met to restart the engine 1 at the lower limit rotational speed Nfc if the range of operation of the engine 1 is defined as Pem≧Pe≧0.

However, when the range of operation of the engine 1 is defined to be Pem≧Pe≧0 to use all the fuel economizing characteristic curve Fec, the output power Pe of the engine 1 falls below the above described lowest power level Pel and into the range of Pel≧Pe≧0 where the fuel efficiency is rapidly degraded. Then, the net result will be poor fuel efficiency when the vehicle is running.

When the engine 1 is so controlled as to use the entire range of Pem≧Pe≧0 on the fuel economizing characteristic curve Fec as described above, the characteristic curve of the solid line L4 in FIG. 7 is extended for the pedaled quantity Acc of the accelerator pedal along the dotted line LB for Acc<Acco that provides Ne=Ni+dNe for Acc=0. The value of dNe for Acc=0 on the characteristic curve obtained by the extension of the dotted line LB is such that the rotational speed of the engine 1 is slightly higher than the rotational speed Ni for idling by dNe and the output power of the engine 1 at Acc=0 includes supplementary power that can be used for accelerating the rotational motion of the flywheel 3 at the time of concurrence.

In FIGS. 7 and 8, the output power of the engine 1 is equal to nil at the rotational speed Ni of the engine 1 for idling.

The operation of the engine 1 at the time of concurrence for Acc=0 when the engine 1 is controlled over the entire range of Pem≧Pe≧0 on the fuel economizing characteristic curve Fec will be described in greater detail below. That the automobile is running and Acc=0 refers to a state where the power required for the output shaft 6 is nil and hence the automobile is running by the force of inertia. Therefore, for Acc=0, it is not necessary to take out energy from the flywheel 3 to the output shaft 6 and power from the engine 1.

When it is not necessary for the engine 1 to output power, the engine 1 may be stopped or operated for idling to nullify the output power of the engine 1.

Even in a state where no energy is taken out from the flywheel 3 for Acc=0, the rotational speed of the flywheel 3 will gradually fall with time because of the power loss at the bearing and so on until a time of concurrence comes to restart the engine 1 and reaccelerate the rotational motion of the flywheel 3.

When a time of concurrence comes for Acc=0, the engine 1 is restarted and the rotational motion of the flywheel 3 is accelerated. At this time, the operation of the engine 1 has to meet the above described requirements for the time of concurrence.

As pointed out earlier, the requirements to be met at the time of concurrence for $0 \leq Acc < 1.0$ include that the engine 1 outputs (1) the power currently required for the output shaft 6 that corresponds to the pedaled quantity Acc of the accelerator pedal and (2) the supplementary power that can accelerate the rotational motion of the flywheel 3. Therefore, since the power required for the output shaft 6 as requirement (1) above is nil for Acc=0, the power that the engine 1 should output at the time of concurrence for Acc=0 is only the supplementary power of the requirement (2) that can be used to accelerate the rotational motion of the flywheel 3.

Thus, as a result, the operation of the engine 1 at the time of concurrence for Acc=0 is such that its rotational speed is higher than the rotational speed Ni for idling, where the output power of the engine 1 is nil, by dNe. In other words, the engine 1 operates along the fuel economizing characteristic curve Fec (FIG. 6) when the rotational speed of the engine 1 is higher than the rotational speed Ni for idling by dNe.

When the engine 1 operates so as to raise its rotational speed to a level higher than the level of the rotational speed Ni for idling by dNe, it is raising the output power by an amount that corresponds to the supplementary power that can be used for accelerating the rotational speed of the flywheel 3.

For the above-described reason, the rotational speed of the engine 1 is higher than the rotational speed Ni of the engine 1 for idling by dNe for Acc=0 at the time of concurrence in FIG. 7.

As pointed out above, the characteristic curve Nfc of line L6 in FIG. 8 is drawn by using FIG. 7. Therefore, the characteristic curve Nfc of the line L6 in FIG. 8 that is used for controlling the engine 1 operating along the fuel economizing characteristic curve Fec for all the range of $Pem \geq Pe \geq 0$ is extended for the pedaled quantity Acc of the accelerator pedal along the dotted line L9 for Acc<Acco that provides Nfc=Ni+dNe for Acc=0 as will be understood from the above description. Additionally, in FIG. 8, the value of dNe for Acc=0 on the characteristic curve obtained by the extension of the dotted line L9 indicates the supplementary power of the engine 1 that can be used for accelerating the rotational motion of the flywheel 3 as in the case of FIG. 7.

On the basis of the above description, the operation of the embodiment at the true time of concurrence can be summarized as follows. When the power that corresponds to the pedaled quantity Acc of the accelerator pedal is output to the output shaft 6 only by using the rotational energy of the flywheel 3 and consequently the rotational speed Nf of the flywheel 3 is being decelerated, the control unit 7A determines the value of Acc×Pem=Pei for each pedaled quantity Acc of the accelerator pedal indicated by the driver, where Pem is the largest power output (including the imaginary largest power output at point Pmi) on the fuel economizing characteristic curve Fec.

Then, the control unit 7A determines the rotational speed Nei that corresponds to the power value Pei of the engine 1 from the fuel economizing characteristic curve Fec and computationally determines the lower limit rotational speed Nfc of the flywheel 3 obtained by adding a predetermined value of dNe to the value of Nei. When the rotational speed Nf of the flywheel 3 that is being decelerated gets to the level of Nfc, the rotational speed Ne of the engine 1 is set to Ne=Nfc on the fuel economizing characteristic curve Fec to start driving the flywheel 3 and the engine 1 is operated for acceleration along the fuel economizing characteristic curve Fec.

When the pedaled quantity Acc of the accelerator pedal is less than the predetermined low pedaled quantity Acco of the accelerator pedal in the above described control operation, the lower limit rotational speed Nfc of the flywheel 3 is fixed to the constant value of Nfco as shown in FIG. 8. Since the low pedaled quantity Acco of the accelerator pedal can vary depending on the characteristics of the engine involved, an appropriate value that is suitable for the engine involved needs to be selected for the low pedaled quantity Acco in the real control operation.

(Upper Limit Rotational Speed Nfm of Flywheel)

Then, there may arise a problem that, after the engine 1 starts driving the flywheel 3 from the lower limit rotational speed Nfc, to what highest rotational speed it keeps on driving the flywheel 3. The largest rotational speed that the flywheel 3 can get to when it is driven again by the engine 1 is referred to as "upper limit rotational speed Nfm of the flywheel 3" herein.

While the engine 1 is operating, it is required to operate constantly along the fuel economizing characteristic curve Fec of FIG. 6 in order to maximally economize fuel. For this purpose, after the engine 1 starts driving the flywheel 3 from the lower limit rotational speed Nfc, the largest rotational speed that the engine 1 allows is inevitably the rotational speed Nem that corresponds to the largest power on the fuel economizing characteristic curve Fec. Then, when the engine 1 is linked directly to the flywheel 3 and driving the latter, the rotational speed Nf of the flywheel 3 is equal to the rotational speed Ne of the engine 1, or Nf=Ne, so that theoretically it is possible to maintain the relationship of Nfm=Nem in the entire range of the pedaled quantity Acc of the accelerator pedal for the upper limit rotational speed Nfm of the flywheel.

However, in practice, if the rotational speed of the engine 1 rises to the largest rotational speed Nem while the driver is operating the accelerator pedal to give only a small value to the pedaled quantity Acc of the accelerator pedal in order to hold the output power to the drive wheels to a low level, the purring noise of the engine becomes high if compared with ordinary drive operations to give a wrong impression of transmitting large power to the drive wheel to the driver.

From this point of view, the upper limit rotational speed Nfm of the flywheel is preferably not a constant value of Nfm=Nem as indicated by the broken line in FIG. 8 but such that it is expressed by the characteristic curve Nfm of the curved line L7 as indicated by the dotted broken line in FIG. 8, according to which Nfm falls as the pedaled quantity Acc of the accelerator pedal falls. While Nfm falls with the fall of the Acc also in the range of 0<Acc<Acco, the characteristic curve Nfm of the upper limit rotational speed of the flywheel 3 may be modified so as to show a constant value of Nfm=Nfmo in the range of 0<Acc<Acco to correspond to the fact that the characteristic curve Nfc of the lower limit rotational speed of the flywheel 3 shows a constant value in the range of 0<Acc<Acco.

The operation of controlling the engine 1 so as to drive it intermittently when the pedaled quantity Acc is found within a range of $0 \leq Acc \leq 1.0$ is described above.

Figure 9:
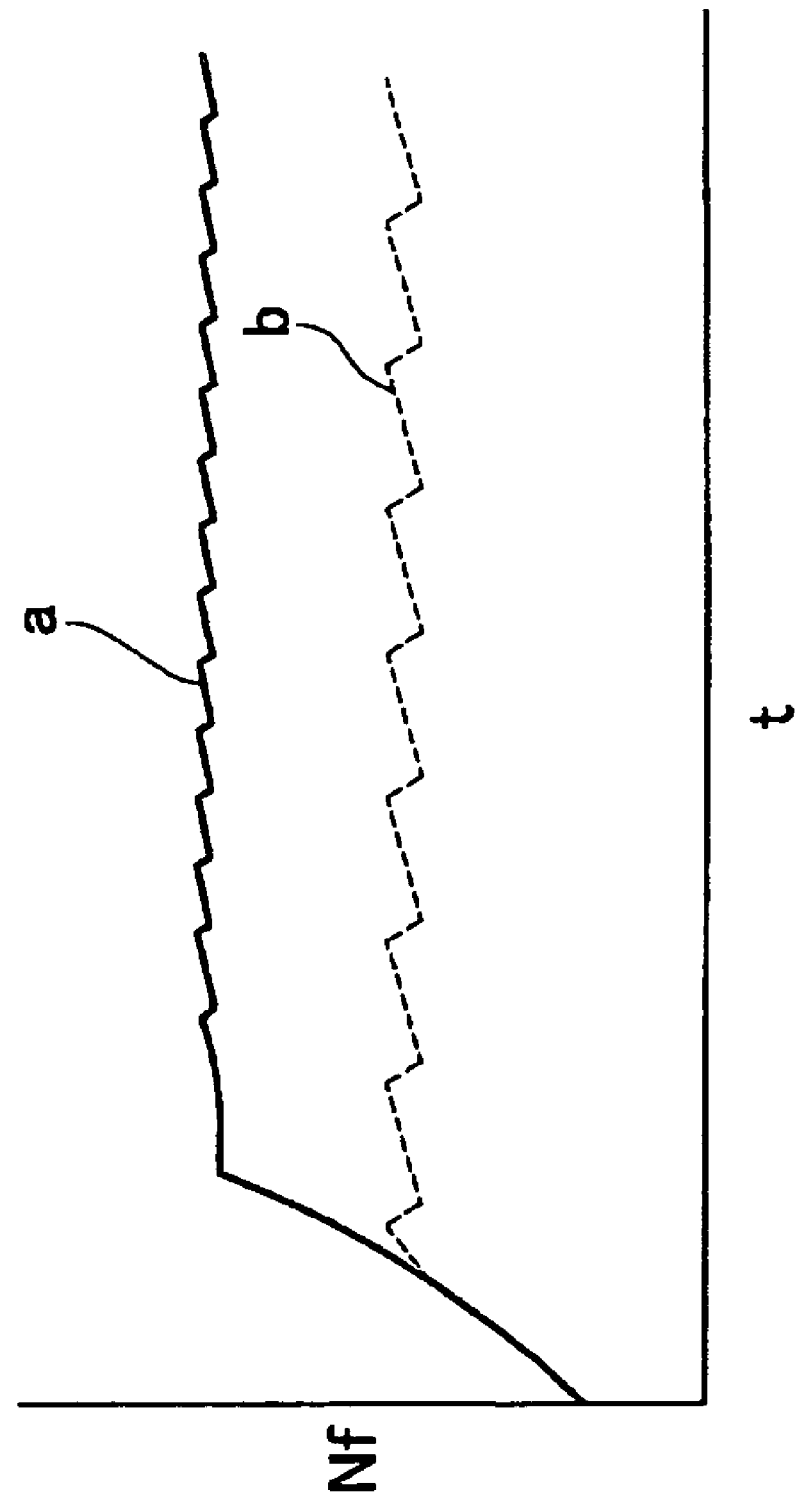
FIG. 9 is a graph illustrating the outcome of a simulation of the rotational speed Nf of a flywheel relative to the elapsed time t when the pedaled quantity Acc of a corresponding accelerator pedal is Acc=0.8 ("a" in FIG. 9) and Acc=0.4 ("b" in FIG. 9).

FIG. 9 summarily shows the results of a simulation conducted for the rotational speed Nf of the flywheel 3 of a flywheel energy accumulation/driving system of FIG. 2 with basic control under the condition that characteristic curve of the lower limit rotational speed Nfc and that of the upper limit rotational speed Nfm of the flywheel 3 as illustrated in FIG. 8 are used for the simulation.

In FIG. 9, the horizontal axis t represents the elapsed time and the vertical axis Nf represents the rotational speed of the flywheel 3. In FIG. 9, "a" indicates the result of the simulation obtained when the pedaled quantity Acc of the accelerator pedal is Acc=0.8, whereas "b" indicates the result of the simulation obtained when the pedaled quantity Acc of the accelerator pedal is Acc=0.4.

In the results "a" and "b" of the simulation, each of the parts where the rotational speed Nf of the flywheel 3 increases with time indicates a condition where the engine 1 drives the output shaft 6 and also the flywheel 3 to rotate. On the other hand, each of the parts where the rotational speed Nf of the flywheel 3 decreases with time indicates a condition where the engine 1 is stopped and the output shaft 6 is driven only by the rotational energy of the flywheel 3.

While FIG. 9 shows the results of a simulation conducted for a flywheel energy accumulation/driving system of FIG. 2, similar results are obtained by a simulation conducted for a flywheel energy accumulation/driving system of FIG. 1 by using similar characteristic curves.

While the engine 1 is a gasoline engine in the above embodiment, the present invention can be applied to any thermal engines including diesel engines and gas turbines. This is because thermal engines can operate for rotational motions over a wide range and it is possible to find a fuel economizing characteristic curve that economize fuel consumption within the range of rotational operation so that the control unit 7A can control the thermal engine so as to operate it intermittently within an advantageous range along the fuel economizing characteristic curve when the thermal engine supplies rotational energy to the flywheel 3 and the input shaft 4a.

INDUSTRIAL APPLICABILITY

The applicable fields of a method of controlling the operation of driving a flywheel and accumulating energy according to the present invention is not limited to automobiles but include various work machines, agricultural machines, railway power cars and ships having a power transmission system that operates with a variable load power.

What is claimed is:

1. A method of controlling a vehicle driving system;
   (A) by accumulating the output power of an engine operating along a fuel economizing characteristic curve in a flywheel interlocked with the engine through a drive shaft as energy, transmitting the output power of the engine or the accumulated energy to an output shaft by way of a power transmission system to drive the output shaft and the drive wheels of the vehicle interlocked with the output shaft to rotate, wherein the engine can be restarted to supply rotational energy to the flywheel,
   (B) the power transmission system;
      (a) having a first motor generator interlocked with the flywheel by way of an input shaft and also with the output shaft by way of an outlet shaft and a second motor generator for receiving the output power of the first motor generator as input,
      (b) the power output from the engine being transmitted sequentially by way of the drive shaft, the flywheel and the input shaft to intermittently accelerate the rotational motion of the flywheel and drive the input shaft,
      (c) the first motor generator operatively generating electric power according to the relative revolutions of the input shaft and the outlet shaft,
      (d) the second motor generator being interlocked with the drive wheels interlocked with the output shaft,
      (e) basic control being defined so as to supply all the electric power generated by the first motor generator to the second motor generator,
   (C) the control method being adapted to cause the output shaft to output a torque proportional to the pedaled quantity of an accelerator pedal,
   (D) the control method being adapted to control the condition of a continuously decreasing rotational speed of the flywheel by driving the drive wheels only by the rotational energy of the flywheel,
   (E) provided that;
      (i) the rotational speed of the flywheel at the time of restarting the engine in order for the engine to supply rotational energy to the flywheel is the lower limit rotational speed Nfc of the flywheel,
      (ii) the largest power level of the engine operating on the fuel economizing characteristic curve is Pem, and
      (iii) the pedaled quantity Acc of the accelerator pedal corresponding to the largest power level Pem is Acc=1.0, the value of the lower limit rotational speed Nfc within the range of the pedaled quantity Acc of 0<=Acc<1.0 is determined by;
         (i) obtaining the power level of Acc×Pem=Pei, wherein Pei equals the power required for the output shaft,
         (ii) obtaining the rotational speed Nei of the engine for the power level Pei on the fuel economizing characteristic curve, and
         (iii) adding a predetermined value dNe to the value of Nei.

2. The method according to claim 1, wherein if a predetermined low pedaled quantity Acc of the accelerator pedal is Acc=Acco within the range of the pedaled quantity Acc<1.0, lower limit rotational speed of the flywheel is held to a constant level of Nfco for the range of the pedaled quantity Acc of 0<=Acc<Acco.

3. The method according to claim 2, including the step of providing the Acco equal to the low level pedaled quantity of the accelerator pedal corresponding to the point on the fuel economizing characteristic curve where the efficiency of the engine rapidly falls toward the rotational speed of the engine for idling.

4. The method according to claim 1, wherein the value of dNe is equal to about 100 rpm.

* * * * *